(12) United States Patent
Keeler et al.

(10) Patent No.: US 9,507,538 B2
(45) Date of Patent: *Nov. 29, 2016

(54) FILE MANAGEMENT SYSTEM FOR DEVICES CONTAINING SOLID-STATE MEDIA

(71) Applicant: Seagate Technology LLC, Cupertino, CA (US)

(72) Inventors: Stanton M. Keeler, Longmont, CO (US); Steven S. Williams, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/739,122

(22) Filed: Jun. 15, 2015

(65) Prior Publication Data

US 2015/0277799 A1 Oct. 1, 2015

Related U.S. Application Data

(63) Continuation of application No. 12/612,159, filed on Nov. 14, 2009, now Pat. No. 9,110,594.

(51) Int. Cl.
*G06F 7/00* (2006.01)
*G06F 17/30* (2006.01)
*G06F 3/06* (2006.01)

(52) U.S. Cl.
CPC ............ *G06F 3/0619* (2013.01); *G06F 3/061* (2013.01); *G06F 3/064* (2013.01); *G06F 3/068* (2013.01); *G06F 3/0643* (2013.01); *G06F 3/0679* (2013.01); *G06F 17/30312* (2013.01); *G06F 17/30598* (2013.01); *G06F 17/30705* (2013.01); *G06F 2003/0691* (2013.01); *G06F 2206/1014* (2013.01)

(58) Field of Classification Search
CPC ................... G06F 17/30312; G06F 17/30598; G06F 17/30705
USPC .......................................................... 707/737
See application file for complete search history.

(56) References Cited

U.S. PATENT DOCUMENTS 5,661,848 A * 8/1997 Bonke ................... G06F 3/0601
 360/48
6,230,234 B1 * 5/2001 Estakhri ................ G06F 3/0613
 711/103
6,499,083 B1 * 12/2002 Hamlin ................. G06F 3/0611
 711/112

(Continued)

OTHER PUBLICATIONS

Prosecution history from U.S. Appl. No. 12/612,159 including Notice of Allowance issued on Feb. 4, 2015, Advisory Action issued on Dec. 16, 2014, Advisory Action issued on Oct. 30, 2014, Final Rejection issued on Aug. 13, 2014, Non-Final Rejection issued on Feb. 12, 2014, Final Rejection issued on May 7, 2012 and Non-Final Rejection issued on Dec. 19, 2011; 88 pages.

*Primary Examiner* — Mark E Hershley
(74) *Attorney, Agent, or Firm* — Westman, Champlin & Koehler, P.A.

(57) ABSTRACT

A device comprising a file management system that includes a plurality of first entries and second entries. The first entries are configured function as a logical block address mapping table for data searching operations on data files stored in data blocks of the device, and the second entries are configured to organize the plurality of data blocks into separate logical groups.

16 Claims, 17 Drawing Sheets

(56) References Cited

U.S. PATENT DOCUMENTS

| | | | |
|---|---|---|---|
| 6,769,081 B1* | 7/2004 | Parulkar | G11C 29/16 714/733 |
| 6,772,274 B1* | 8/2004 | Estakhri | G06F 12/0246 711/103 |
| 6,842,829 B1 | 1/2005 | Nichols et al. | |
| 7,047,356 B2* | 5/2006 | Chen | G06F 12/0873 711/113 |
| 7,107,404 B2* | 9/2006 | Ohtsubo | G06F 12/0866 711/129 |
| 7,464,240 B2* | 12/2008 | Caulkins | G06F 3/0616 711/103 |
| 7,873,619 B1* | 1/2011 | Faibish | G06F 17/30091 707/705 |
| 8,078,687 B1* | 12/2011 | Galasso | G06F 3/0631 707/791 |
| 2002/0161774 A1* | 10/2002 | Tol | G11B 27/034 |
| 2003/0135729 A1 | 7/2003 | Mason, Jr. et al. | |
| 2003/0145165 A1 | 7/2003 | Herbst et al. | |
| 2003/0149815 A1 | 8/2003 | Williams et al. | |
| 2004/0162950 A1 | 8/2004 | Coulson | |
| 2004/0202073 A1 | 10/2004 | Lai et al. | |
| 2005/0144365 A1* | 6/2005 | Gorobets | G06F 11/1072 711/103 |
| 2005/0144396 A1* | 6/2005 | Eschmann | G06F 12/0804 711/143 |
| 2005/0144517 A1* | 6/2005 | Zayas | G06F 12/0866 714/6.13 |
| 2005/0251617 A1* | 11/2005 | Sinclair | G06F 3/061 711/103 |
| 2006/0155939 A1* | 7/2006 | Nagasoe | G06F 3/062 711/152 |
| 2006/0271750 A1* | 11/2006 | Serizawa | G06F 3/0607 711/156 |
| 2007/0033329 A1* | 2/2007 | Sinclair | G06F 3/0605 711/103 |
| 2007/0050535 A1* | 3/2007 | Nelson | G06F 12/0246 711/103 |
| 2007/0083567 A1* | 4/2007 | Arai | G06F 11/1435 |
| 2007/0150774 A1 | 6/2007 | Seng et al. | |
| 2007/0174582 A1 | 7/2007 | Feldman | |
| 2007/0174736 A1 | 7/2007 | Yoshida | |
| 2007/0174737 A1* | 7/2007 | Yoshida | G11B 20/1883 714/53 |
| 2007/0204100 A1 | 8/2007 | Shin et al. | |
| 2007/0245069 A1* | 10/2007 | Kikuchi | G06F 12/0246 711/103 |
| 2008/0034174 A1* | 2/2008 | Traister | G06F 12/0246 711/159 |
| 2008/0071970 A1* | 3/2008 | Lin | G06F 12/0246 711/103 |
| 2008/0082775 A1* | 4/2008 | Gorobets | G06F 12/0246 711/170 |
| 2008/0091872 A1* | 4/2008 | Bennett | G06F 12/0246 711/103 |
| 2008/0109589 A1* | 5/2008 | Honda | G06F 3/0607 711/103 |
| 2008/0172519 A1 | 7/2008 | Schmulevich et al. | |
| 2008/0177938 A1 | 7/2008 | Yu | |
| 2008/0307155 A1* | 12/2008 | Sinclair | G06F 3/061 711/103 |
| 2008/0307158 A1* | 12/2008 | Sinclair | G06F 12/0246 711/103 |
| 2008/0307192 A1* | 12/2008 | Sinclair | G06F 12/0246 711/218 |
| 2009/0019218 A1* | 1/2009 | Sinclair | G06F 11/1072 711/103 |
| 2009/0055620 A1* | 2/2009 | Feldman | B82Y 25/00 711/202 |
| 2009/0109786 A1* | 4/2009 | Ye | G06F 12/0246 365/228 |
| 2009/0150135 A1 | 6/2009 | Cressman | |
| 2009/0240880 A1* | 9/2009 | Kawaguchi | G06F 3/0617 711/114 |
| 2009/0271562 A1* | 10/2009 | Sinclair | G06F 12/0246 711/103 |
| 2010/0023682 A1* | 1/2010 | Lee | G06F 12/0246 711/103 |
| 2010/0037001 A1* | 2/2010 | Langlois | G06F 12/0246 711/103 |
| 2010/0057976 A1* | 3/2010 | Lasser | G11C 16/20 711/103 |
| 2010/0169542 A1* | 7/2010 | Sinclair | G06F 12/0246 711/103 |
| 2010/0174847 A1* | 7/2010 | Paley | G06F 12/0246 711/103 |
| 2010/0257306 A1* | 10/2010 | Kawaguchi | G06F 3/0616 711/103 |
| 2011/0145528 A1* | 6/2011 | Watanabe | G06F 3/0605 711/162 |
| 2011/0185105 A1* | 7/2011 | Yano | G06F 12/0246 711/103 |

\* cited by examiner

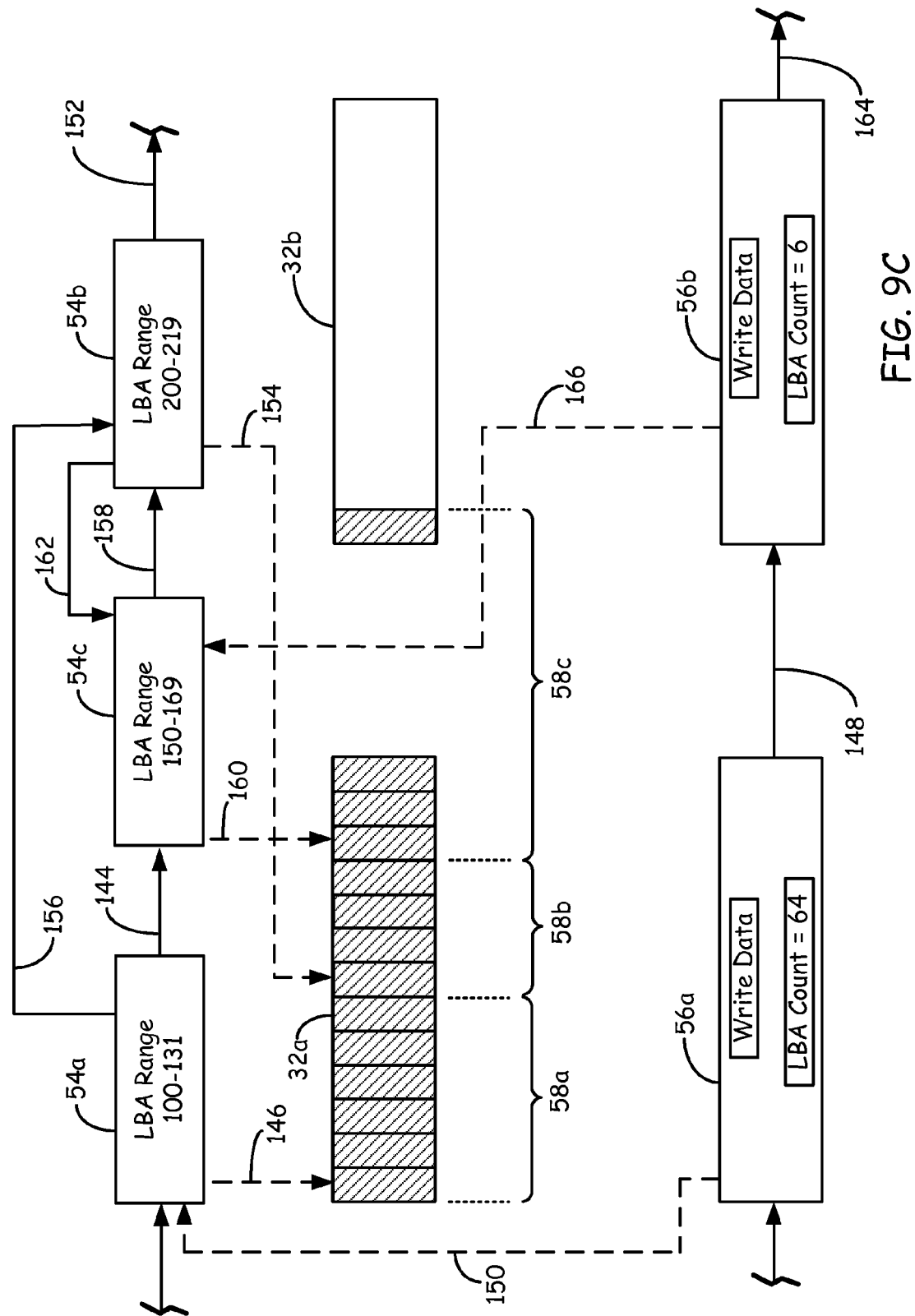

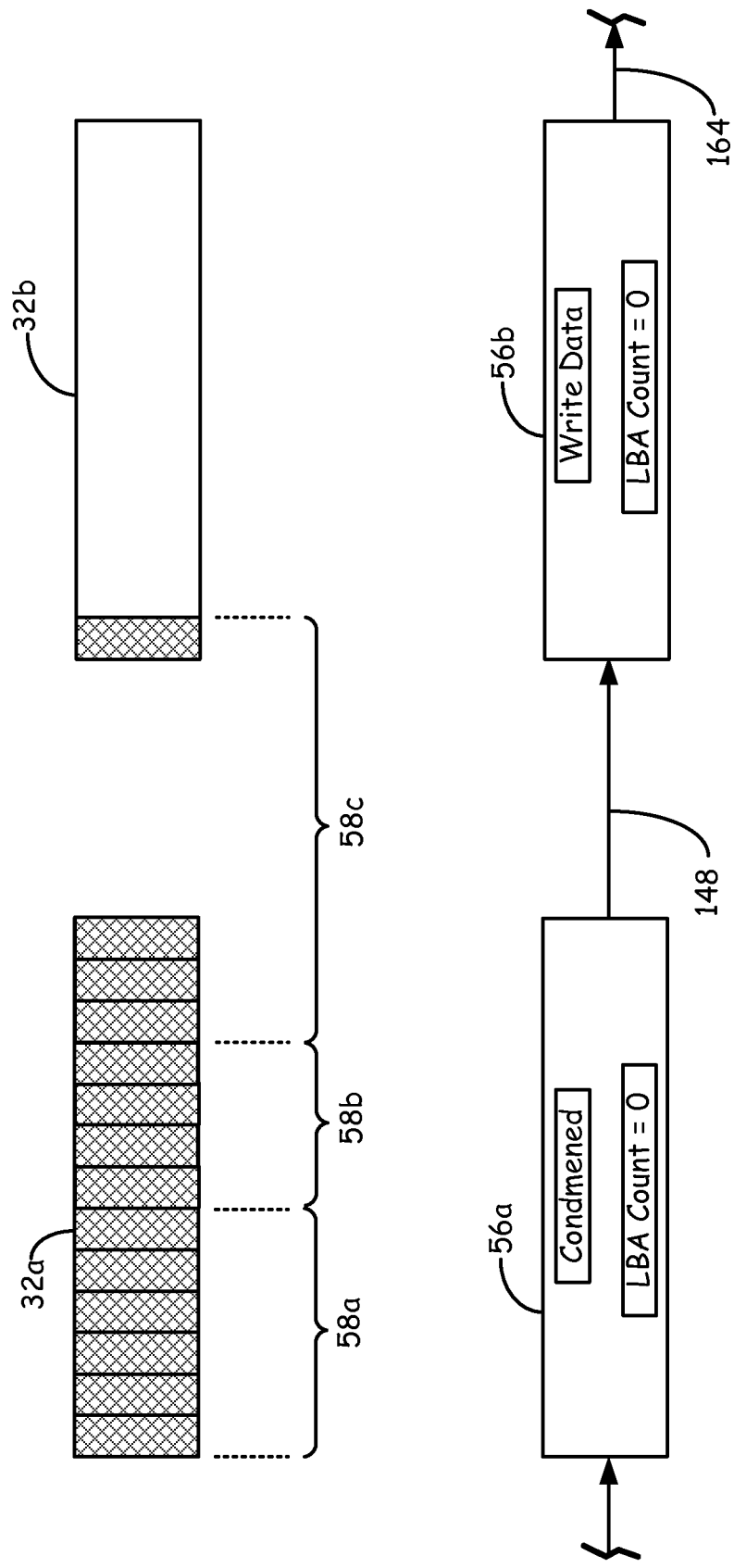

FILE MANAGEMENT SYSTEM FOR DEVICES CONTAINING SOLID-STATE MEDIA

CROSS-REFERENCE TO RELATED APPLICATION

This application is a continuation application of U.S. application Ser. No. 12/612,159 filed on Nov. 4, 2009, entitled "FILE MANAGEMENT SYSTEM FOR DEVICES CONTAINING SOLID-STATE MEDIA", the content of which is hereby incorporated by reference in its entirety.

BACKGROUND

The present disclosure relates to devices, such as data storage devices containing solid-state media. In particular, the present disclosure relates to the management of data files in data storage devices having solid-state media.

Data storage devices containing solid-state media are becoming increasingly popular for the storage of data. This is primarily due to their robust architecture, low power consumption, and compact designs. For example, a common use of flash-based storage devices is in combination with computer interfaces, such as universal serial bus (USB) interfaces, to provide fast-access flash drives that can read and write data in a manner that is convenient for users. Such drives typically have substantial storage capacities, which is ideal for storing and transferring data between different computer systems. Additionally, many industries are focusing on larger, more permanent sold-state storage devices to replace or supplement hard disks in a variety of computer systems. These solid-state drives desirably have large storage capacities and may function as the primary drives of the computer systems for retaining operating systems, applications, documents, and other data files.

Sold-state media is also being used as non-volatile caches for hard disk storage devices. In these hybrid drives, logical block addresses (LBAs) are typically mapped to the track sectors of the hard disk in a one-to-one manner. This one-to-one arrangement is attainable because track sectors in hard disks may be directly overwritten with new data. In comparison, however, data blocks of solid-state media typically cannot be rewritten without erasing the given data blocks first. As such, data written to solid-state media may be scattered amongst the different data blocks, which can substantially increase file search times. Accordingly, there is a need for a system to manage data files stored on sold-state media that provides fast data file searching and that also reduces the memory bandwidth required to maintain the management system.

SUMMARY

An aspect of the present disclosure is directed to a device that includes at least one non-volatile storage medium having a plurality of data blocks, and a file management system stored on the at least one non-volatile storage medium. The file management system includes a plurality of logical block address extent entries configured to associate with data files stored in the data blocks, and a plurality of descriptor entries configured to associate with the data blocks. The device also includes a controller configured to manage operations with the at least one non-volatile storage medium based at least in part on the file management system.

Another aspect of the present disclosure is directed to a file management system stored on a computer storage medium. The file management system includes a plurality of first entries (e.g., LBA extent entries) configured function as a logical block address mapping table for data searching operations with data blocks of at least one non-volatile storage medium. The files management system also includes a plurality of second entries (e.g., descriptor entries) configured to organize the plurality of data blocks into separate logical groups to manage writing and/or reading operations.

Another aspect of the present disclosure is directed to a method for operating a data storage device. The method includes providing a data file to the data storage device, where the data file corresponding to a logical block address range. The method also includes creating a logical block address extent entry corresponding to the logical block address range, updating a descriptor entry associated with a data block of a non-volatile storage medium of the data storage device, and writing at least a portion of the data file to the data block.

BRIEF DESCRIPTION OF THE DRAWINGS

FIGS. 9A-9F are schematic illustrations of data blocks of the solid-state medium of the data storage device, depicting methods in which the file management system manages data the data blocks.

DETAILED DESCRIPTION

The present disclosure is directed to a file management system for managing data files in devices containing solid-state media, such as hybrid drives and solid-state drives. As discussed below, the file management system maps LBAs to physical data blocks of one or more solid-state media with the use of linked "LBA extent entries" and linked "descriptor entries". The LBA extent entries are associated with data files stored in the solid-state media and provide a hardware-searchable table of valid LBAs. The descriptor entries are associated with the physical data blocks of the solid-state media and supplement the LBA extent entries by providing information relating to the physical data blocks. The combination of the LBA extent entries and the descriptor entries reduce search times and memory bandwidth, while also improving data block management.

Figure 1:
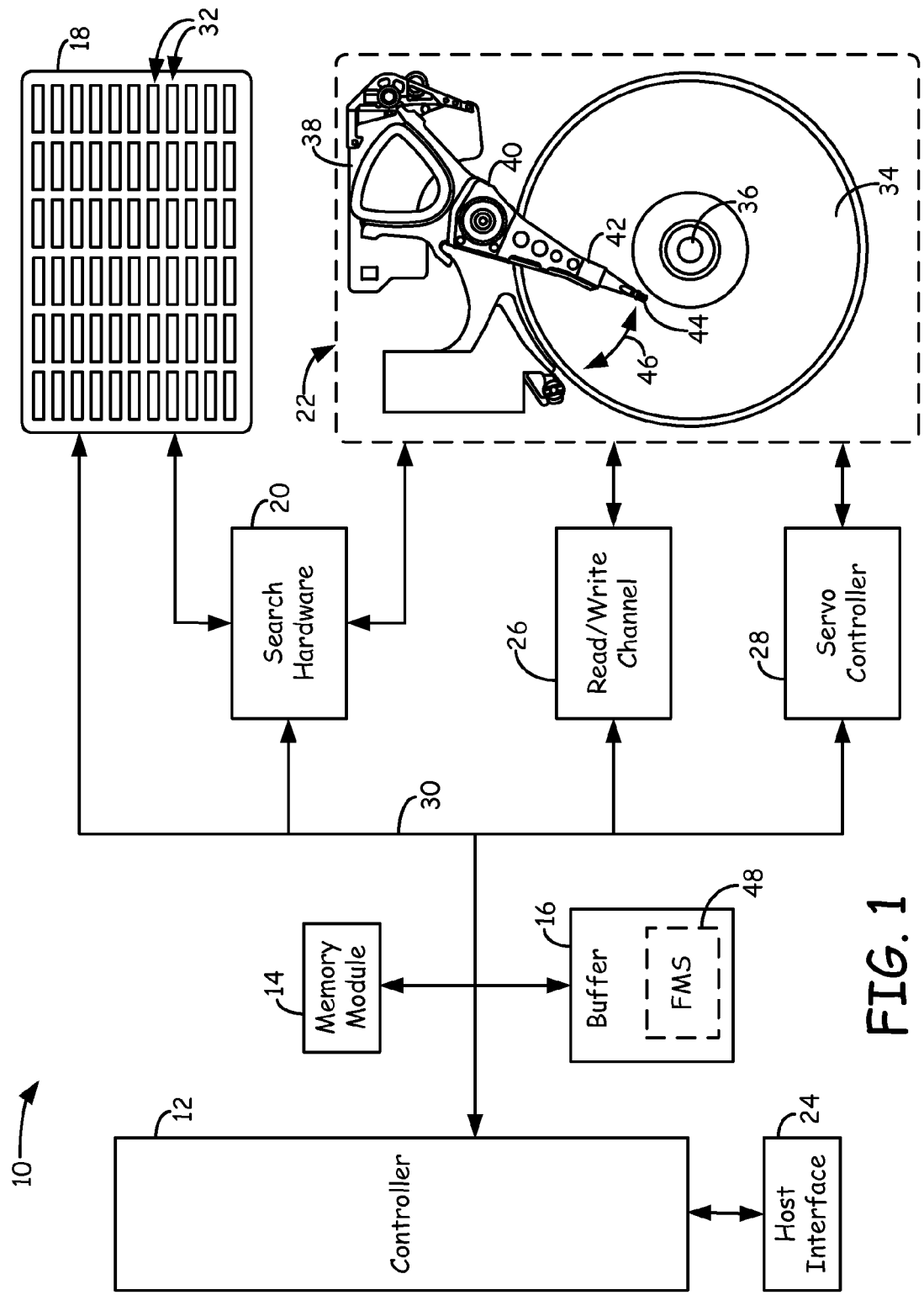
FIG. 1 is a schematic illustration of a data storage device of the present disclosure in use with a host computer.

As shown in FIG. 1, storage device 10 is a data storage device for storing and transferring data with a host computer (not shown) with the use of a file management system of the present disclosure. Storage device 10 includes controller 12, memory module 14, buffer 16, non-volatile memory (NVM) 18, search hardware 20, and head disk assembly (HDA) 22. Suitable host computers for use with storage device 10 may include one or more computer-based systems, such as personal computers, media players, personal digital assistants, game consoles, network systems, server-based systems, and the like.

Controller 12 is one or more microprocessor assemblies configured to direct read and write commands for storage device 10 pursuant to the file management system. Controller 12 may communicate with the host computer via host interface 24, where host interface 24 may be any suitable interface, such as a universal serial bus (USB) interface, a Serial Advanced Technology Attachment (SATA) interface, an External SATA (eSATA) interface, a Parallel Advanced Technology Attachment (PATA) interface, an IEEE 1394 interface, a Small Computer System Interface (SCSI), a Serial Attached SCSI (SAS) interface, an Integrated Drive Electronics (IDE) interface, a Fiber Channel interface, and the like.

Controller 12 manages data transfers between HDA 22 and host interface 24 and with the use of read/write channel 26 and servo controller 28. Read/write channel 26 is a circuit configured to covert data between digital signals processed by controller 12 and analog signals of HDA 22. Storage device 10 may also include one or more pre-amplifiers (not shown) disposed between read/write channel 26 and HDA 22, which may be configured to amplify read and write signals transmitted between read/write channel 26 and HDA 22. Servo controller 28 is a second microprocessor assembly configured to direct seek and track following operations with HDA 22 based on commands from controller 12. While shown as separate microprocessor assemblies, in an alternative embodiments, the functions of controller 12 and servo controller 28 may be performed with a single microprocessor assembly.

Controller 12, memory module 14, buffer 16, NVM 18, search hardware 20, read/write channel 26, servo controller 28 may communicate with each other over bus line 30. While illustrated as a single data line, bus line 30 may alternatively include one or more interconnected or separate data lines configured to allow one or more of the components of storage device 10 to communicate with each other. The components of storage device 10 are also desirably retained with a housing of storage device 10 (not shown). Accordingly, storage device 10 may be internal or external to a casing of the host computer.

Memory module 14 is one or more non-volatile memory modules (e.g., flash memory) for storing information such as firmware. Buffer 16 is one or more volatile memory modules (e.g., dynamic random access memory) that may function as a data buffer during reading and/or writing operations with NVM 18 and HDA 22.

NVM 18 is one or more non-volatile, solid state media, such as flash memory, magnetic random access memory (MRAM), electrically erasable programmable read-only memory (EEPROM), ferroelectric random access memory (FeRAM), and combinations thereof. In the shown embodiment, NVM 18 may function as a non-volatile cache for storage device 10 to assist buffer 16 in buffering and storing data during reading and/or writing operations (e.g., as a hybrid drive). In alternative embodiments, NVM 18 may function as a primary storage medium for storage device 10 (e.g., as a flash memory device or a solid state drive). As shown, NVM 18 includes a plurality of erasable data blocks 32 for storing data.

Search hardware 20 is a hardware-based, search controller configured to search for data retained in NVM 18 and/or HDA 22, based on commands from controller 12. This allows data search operations to be performed quickly and is suitable for use with the file management system of the present disclosure. In alternative embodiments, search hardware 20 may be omitted, and the data search operations in NVM 18 and/or HDA 22 may be performed by controller 12.

HDA 22 includes storage disk 34 and spindle hub 36, where spindle hub 36 is connected to a spindle motor of storage disk 34 (not shown) that is operated by servo controller 28. This arrangement allows servo controller 28 to rotate storage disk 34 during operation based on commands from controller 12. HDA 22 also includes actuation motor 38 (e.g., a voice coil motor), actuator arm 40, suspension assembly 42, and slider 44, where slider 44 carries a transducing head (not shown). Slider 44 is supported by suspension assembly 42, which in turn is supported by actuator arm 40. In the shown embodiment, actuation motor 38 is also controlled by servo controller 28. Based on commands from servo controller 28, actuation motor 38 pivots actuator arm 40 about an axis in order to sweep suspension assembly 42 and slider 44 in an arc across storage disk 34 (represented by arrow 46). An additional microactuation system (not shown) may also be used to produce precise, small-scale movements of suspension assembly 42 and slider 44. As slider 44 moves across storage disk 34, the transducing head carried by slider 44 is desirably positioned relative to selected sector tracks located on storage disk 34. This allows the transducing head to write data to, and read from, the data tracks on storage disk 34 during operation.

During start up of storage device 10, the file management system of the present disclosure may be loaded from NVM 18 and/or HDA 22 into buffer 16 (shown as the file management system (FMS) 48 in buffer 16). As discussed below, FMS 48 includes linked LBA extent entries, which map LBAs recognizable by the host computer with data files retained in data blocks 32 of NVM 18. This allows the data block management of storage device 10 to be transparent to the host computer. In one embodiment, FMS 48 may also map LBAs with the sector tracks of disk 34 to also manage the reading and writing operations with HDA 22 in a manner that is transparent to the host computer.

One benefit of HDA 22 is that the sector tracks of storage disk 34 may be rewritten without requiring them to be previously erased. As such, LBAs recognizable by the host computer may be mapped to the sector tracks of storage disk 34 in a one-to-one arrangement, which simplifies the mapping table. In comparison, however, data blocks 32 of NVM 18 are required to be erased prior to being subsequently rewritten. Additionally, while data files may be written to a data block 32 on a per-page basis, erasure of the data files from the given data block 32 typically requires erasure of the entire data block 32, regardless of whether all of the data files within the data block 32 need to be erased. This may lead to the scattering of data throughout NVM 18. Furthermore, data blocks 32 have limited numbers of erasure counts before failing, thereby limiting the life of NVM 18 to the available erasure counts of data blocks 32.

To accommodate these characteristics of NVM 18, the LBA extent entries of FMS 48 are configured to manage the LBA mapping to the data files stored in data blocks 32 in a manner that reduces the time required to search for the particular data files. This correspondingly reduces read and write times with the host computer. Additionally, the descriptor entries of FMS 48 are configured to assist in managing data blocks 32 by managing how data files are erased from and written to data blocks 32.

Figure 2:
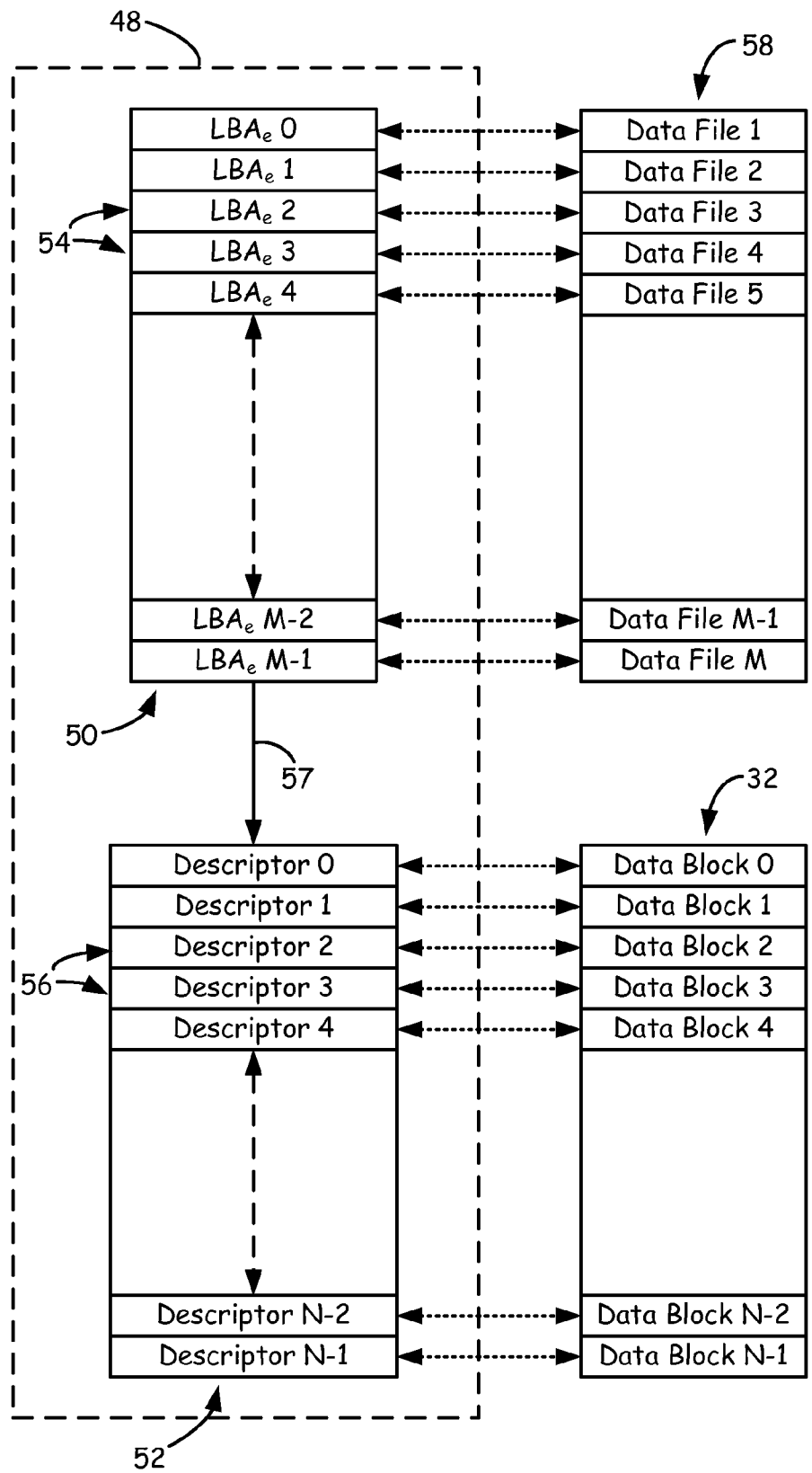
FIG. 2 is a block diagram of a file management system used in the data storage device, where the file management system includes a first array of LBA extent entries and a second array of descriptor entries.

As shown in FIG. 2, FMS 48 includes first array 50 and second array 52, where first array 50 includes "M" number of LBA extent entries (referred to as LBA entries 54), and where second array 52 includes "N" number of descriptor entries 56. During the start up of storage device 10, first array 50 and second array 52 may be read from NVM 18 and/or HDA 22 and written to buffer 16, thereby loading FMS 48 into buffer 16. In the shown embodiment, second array 52 may be linked to first array 50 with pointer 57, which may assist in loading the separate arrays into buffer 16. In an alternative embodiment, the order of first array 50 and second array 52 may be reversed.

Each LBA entry 54 is desirably associated with a single data file or clustered data files stored in one or more data blocks 32 of NVM 18 (referred to as data files 58). Thus, each LBA entry 54 desirably includes information related to the associated data file(s) 58, such as the physical block address and the page address of the particular data block(s) 32 in which the associated data file(s) are stored. The number of LBA entries 54 in first array 50 (i.e., "M") may vary depending the number of data files 58 stored in data blocks 32.

In addition, each LBA entry 54 may map LBAs to the physical data blocks and page addresses in a manner that is readily searchable (e.g., with search hardware 20). As discussed below, each LBA entry 54 desirably includes (1) a starting LBA of the associated data file(s) 58, (2) a length of the LBA range of the associated data file(s) 58, (3) one or more pointers to adjacent LBA entries 54 in numerical order, and (4) one or more pointers to adjacent LBA entries 54 in physical data order. These tools allow the data files 58 in data blocks 32 to be searched quickly regardless of their physical locations and the level of scattering throughout NVM 18.

As further shown in FIG. 2, each descriptor entry 56 is desirably associated with a single data block 32. As such, the number of descriptor entries 56 in second array 52 (i.e., "N") may vary depending the data blocks 32 in NVM 18. This is in comparison to LBA entries 54, which are each associated with one or more data files 58 rather than with particular data blocks 32. As discussed below, each descriptor entry 56 desirably includes pointers to create separate lists of data blocks 32, thereby grouping data blocks 32 into different categories depending on the data files 58 they retain. This grouping of data blocks 32 is a logical grouping rather than a grouping based on their physical locations, and allows FMS 48 to manage how data files 58 are erased from and written to data blocks 32. In addition, each descriptor entry 56 may also include information relating to its associated data block 32, such as the block state, erasure count, valid LBA count, and the like.

LBA Extent Entries

Figure 3:
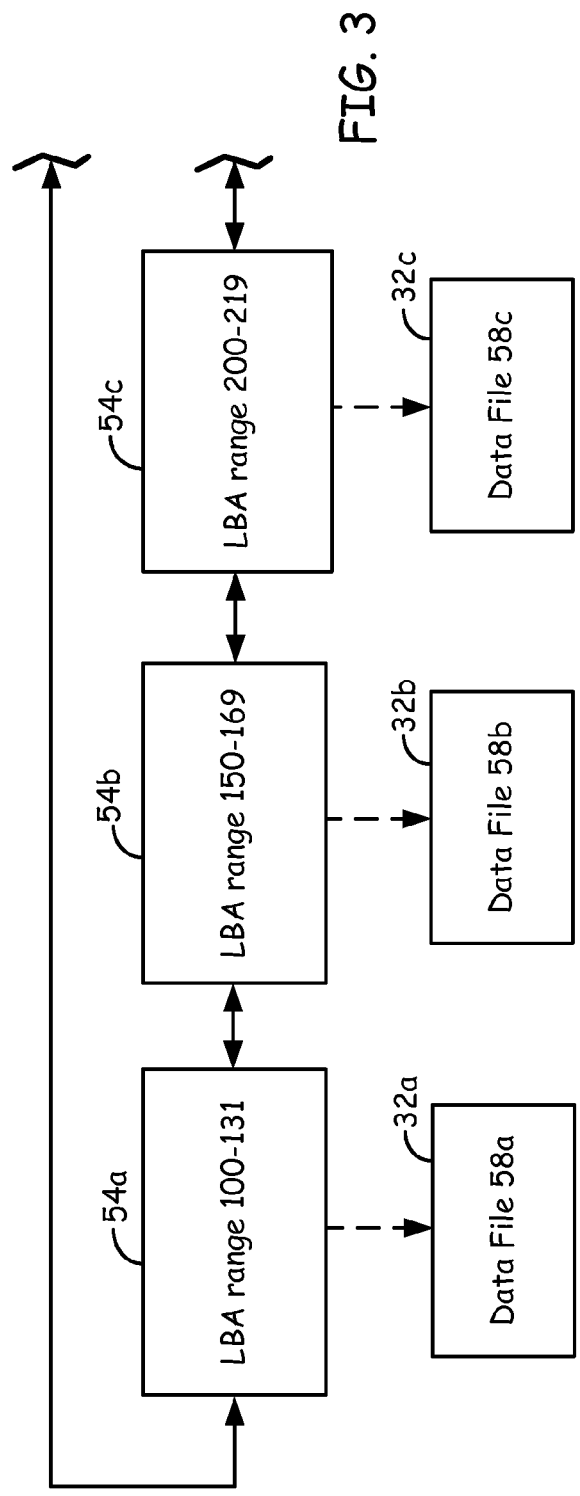
FIG. 3 is a block diagram of a list of the LBA extent entries of the file management system.

FIG. 3 is a schematic illustration of a linked list of LBA entries 54 (e.g., LBA entries 54a, 54b, and 54c) with their associated data files 58 (e.g., data files 58a, 58b, and 58c) stored in data blocks 32 (e.g., data blocks 32a, 32b, and 32c). After being loaded into buffer 16, the pointers in LBA entries 54a, 54b, and 54c form a linked list in numerical LBA order. This creates an LBA mapping table to the associated data files 58a, 58b, and 58c.

This mapping table allows the LBAs to be quickly searched (e.g., with search hardware 20) to locate the LBA range of a particular data file 58. For example, when the host computer sends a request to read data file 58b corresponding to LBA range 150-169, search hardware 20 may scan through LBA entries 54 until it identifies LBA entry 54b. Based on the physical block and page addresses in LBA entry 54b, the firmware of storage device 10 can then read data file 58b from data block 32b. Since search hardware 20 only needs to search the linked list of LBA entries 54, the data blocks 32 containing the desired data files 58 can be scattered throughout NVM 18 without affecting the search times.

Figure 4:
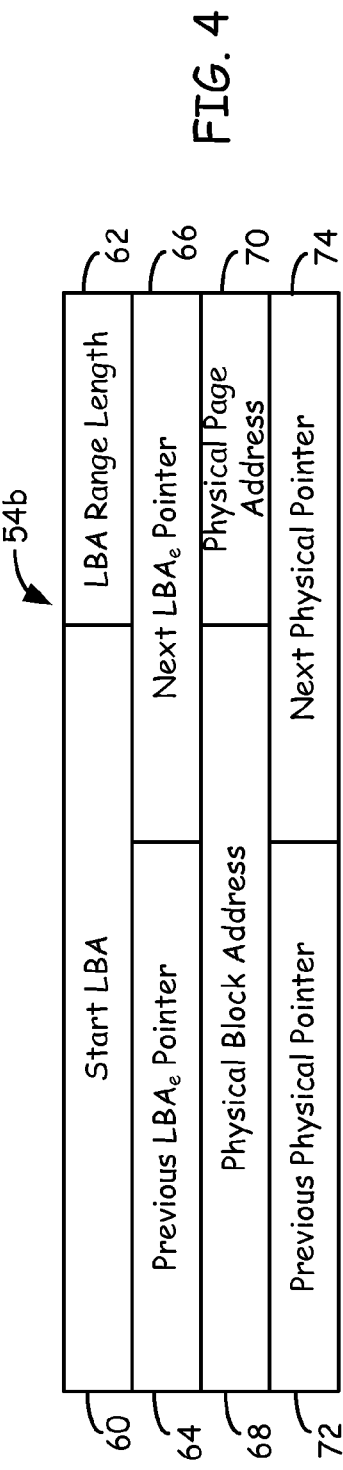
FIG. 4 is a block diagram of an exemplary LBA extent entry.

FIG. 4 is a block diagram of LBA entry 54b, which is an example of suitable arrangement for each LBA entry 54. As shown, LBA entry 54b includes mapping files 60-74, which are data files that contain information associated with data file 58b stored in data block 32b. LBA entry 54b may also include additional information, such as address levels, LBA extension fields, pointer extension fields, most-recently used list information, and the like.

Mapping file 60 includes the starting LBA for data file 58b, which, in the current example, is "150". Mapping file 62 corresponding includes the length of the LBA range for data file 58b, which is the number of pages in data block 32b that data file 58b is stored in. In the current example, the LBA range length stored in mapping file 62 is "20". These values in mapping files 60 and 62 are the values that search hardware 20 may read when scanning through LBA entry 54b to identify if LBA entry 54b contains the desired LBA range for data file 58b.

Mapping files 64 and 66 respectively include pointers to the previous and next LBA entries 54, based on the numerical LBA order. In the current example, the previous LBA extent entry pointer in mapping file 64 links LBA entry 54b to LBA entry 54a. Similarly, the next LBA extent entry pointer in mapping file 66 links LBA entry 54b to LBA entry 54c. This forward-and-backward arrangement links LBA entries 54 in a list based on the LBA ranges, thereby providing a mapping table for search hardware 20 to scan. Additionally, the list of linked LBA entries 54 may be updated each time a new LBA range is added (e.g., writing new data) and each time an existing LBA range is removed (e.g., when invalidating the given LBA range).

Mapping file 68 includes the physical block address of data block 32 containing the data file associated with LBA range 150-169 (i.e., data block 32b). Similarly, mapping file 70 includes the starting page address within data block 32b in which data file 58b is stored. In the embodiments discussed herein, each LBA is associated with a single physical page within a data block 32. However, FMS 48 may alternatively function in a similar manner with a variety of different LBA associations (e.g., sector-based associations). When search hardware 20 identifies LBA entry 54b as containing LBA range 150-169, the physical location of data file 58b in NVM 18 may be identified by the information stored in mapping files 68 and 70. This then allows the firmware of storage device 10 to read data file 58b from data block 32b.

Mapping files 72 and 74 respectively include pointers to the previous and next LBA entries 54 that contain data files 58 that are located physically adjacent to data file 58b. This allows LBA entries 54 of data files 58 that are physically adjacent to each other to readily identified, such as for cache flushing operations.

Figure 5:
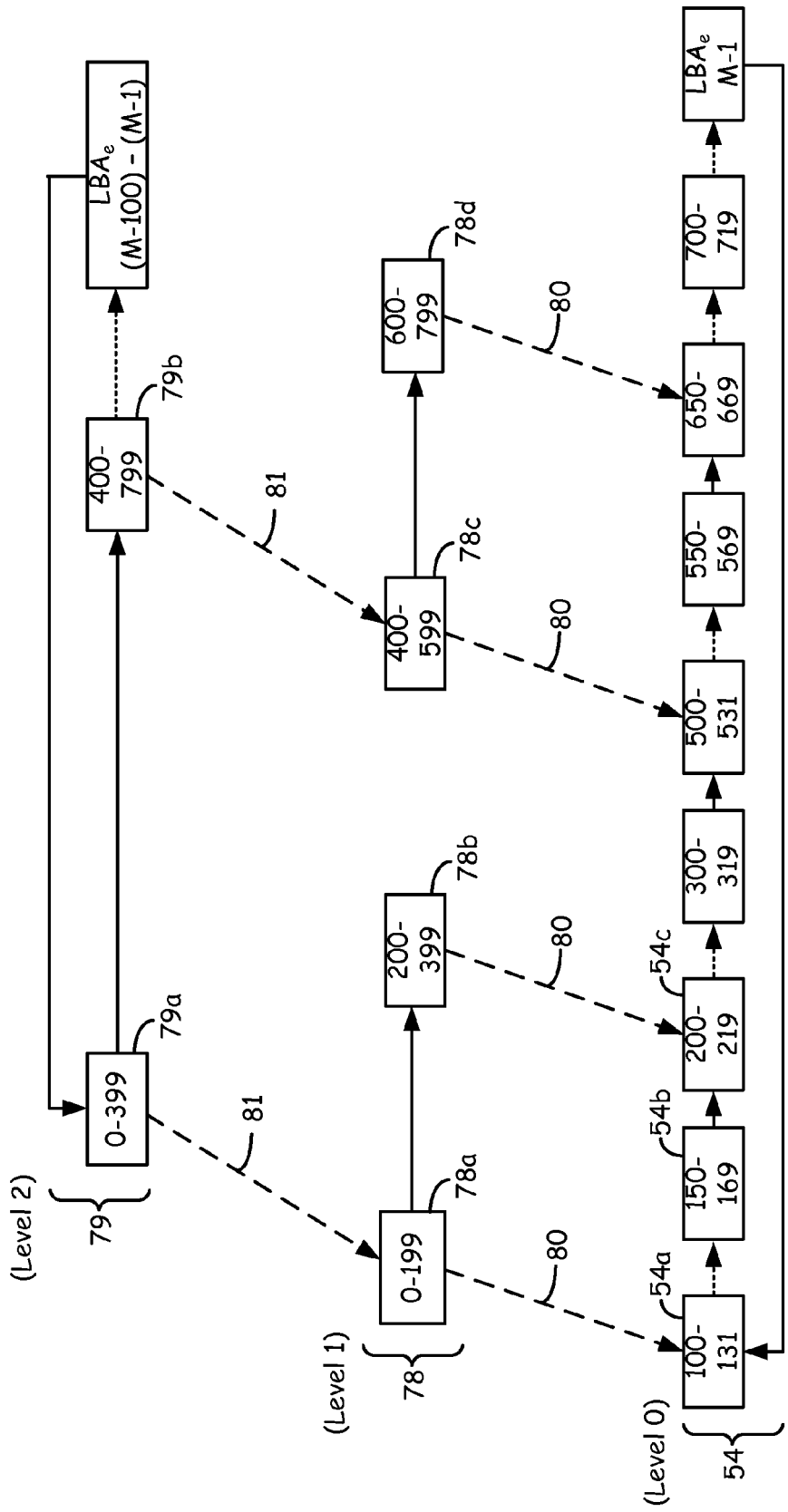
FIG. 5 is a block diagram of a tiered table of the LBA extent entries.

FIG. 5 is a schematic illustration of tiered table 76, which is an example of a suitable alternative arrangement for searching the LBA ranges in LBA entries 54. As shown, tiered table 76 includes a three-level arrangement, where level 0 entries correspond to the listing of LBA entries 54 in numerical LBA order. The level 1 entries include middle sets 78 (e.g., middle sets 78a-78d), and the level 2 entries include top sets 79 (e.g., top sets 79a and 79b), which together function as a top-down hierarchal search table.

Each middle set 78 in level 1 desirably encompasses multiple LBA entries 54 in level 0, where each middle set 78 may include a pointer 80 to the first LBA entry 54 in the encompassed list of LBA entries 54. For example, middle set 78a may encompasses the LBA entries 54 in the LBA range of 0-199, and may include a pointer 80 to the first LBA entry 54 in this LBA range (i.e., LBA entry 54a).

Similarly, each top set 79 in level 2 desirably encompasses multiple middle sets 78, where each top set 79 may include a pointer 81 to the first middle set 78 in the encompassed list of middle sets 78. For example, top set 79a may encompasses the middle sets 78 in the LBA range of 0-399, which includes middle sets 78a and 78b, and may include a pointer 81 to the first middle set 78 in this LBA range (i.e., middle set 78a). Additionally, middle sets 78 in level 1 that are encompassed by a given top set 79 in level 2 may be linked to provide lists of middle sets 78. For example, middle sets 78a and 78b may be linked, and middle sets 78c and 78d may be linked. Furthermore, top sets 79 in level 2 are also desirably linked to provide a top-level list of top sets 79 for search hardware 20 to initially search.

During a search for a data file 58 corresponding to LBA range 200-219, search hardware 20 may search top sets 79 in level 2 until it identifies the top set 79 that covers this LBA span (i.e., top set 79a, which covers LBAs 0-399). As such, search hardware 20 may then link with pointer 81 from top set 79a to middle set 78a. At this point, search hardware 20 may search the list of middle sets 78a and 78b until it identifies which middle set 78 encompasses LBA range 200-219. In the current example, this is middle set 78b covering LBAs 200-399. As such, search hardware 20 may then link with pointer 80 from middle set 78b to LBA entry 54c. At this point, search hardware 20 may search the list of LBA entries 54 encompassed by middle set 78b until it identifies the LBA entry 54 that includes LBA range 200-219. In the current example, this is the LBA entry 54c. After LBA entry 54c is identified, the data file 58 retained in the corresponding data block 32 may then be retrieved, as discussed above.

The use of tiered table 76 reduces the time required for search hardware 20 to search LBA entries 54. In the shown embodiment, tiered table 76 includes three levels. However, tiered table 76 may alternatively include any suitable number of levels. Examples of suitable numbers of levels for tiered table 76 range from one (i.e., a list of LBA entries 54) to ten, with particularly suitable numbers ranging from one to five, and with even more particularly suitable numbers ranging from two to four.

The number of middle sets 78 and top sets 79 in levels 1 and 2, respectively, may also vary. In one embodiment, the number of middle sets 78 in level 1 may be determined as a function of the number of LBA entries 54 that exist in level 0. For example, the number of middle sets 78 in level 1 may be the square root of the number of LBA entries 54 that exist in level 0. Similarly, the number of top sets 79 in level 2 may be determined as a function of the number of middle sets 78 that exist in level 1 (e.g., the square root of the number of middle sets 78 that exist in level 1).

Furthermore, the LBA spans encompassed by each middle set 78 and each top set 79 may adjust in response to the additions and removals of LBA entries 54 in level 0. In one embodiment, this change LBA span coverage desirably maintains a substantially equal number of LBA entries 54 in level 0 under each middle set 78 in level 1, and also desirably maintains a substantially equal number of middle sets 78 in level 1 under each top set 79 in level 2. This arrangement allows tiered table 76 to vary based on the numbers of LBA entries 54 in level 0, which can substantially reduce the time required for search hardware 20 to search tiered table 76.

Descriptor Entries

Figure 6:
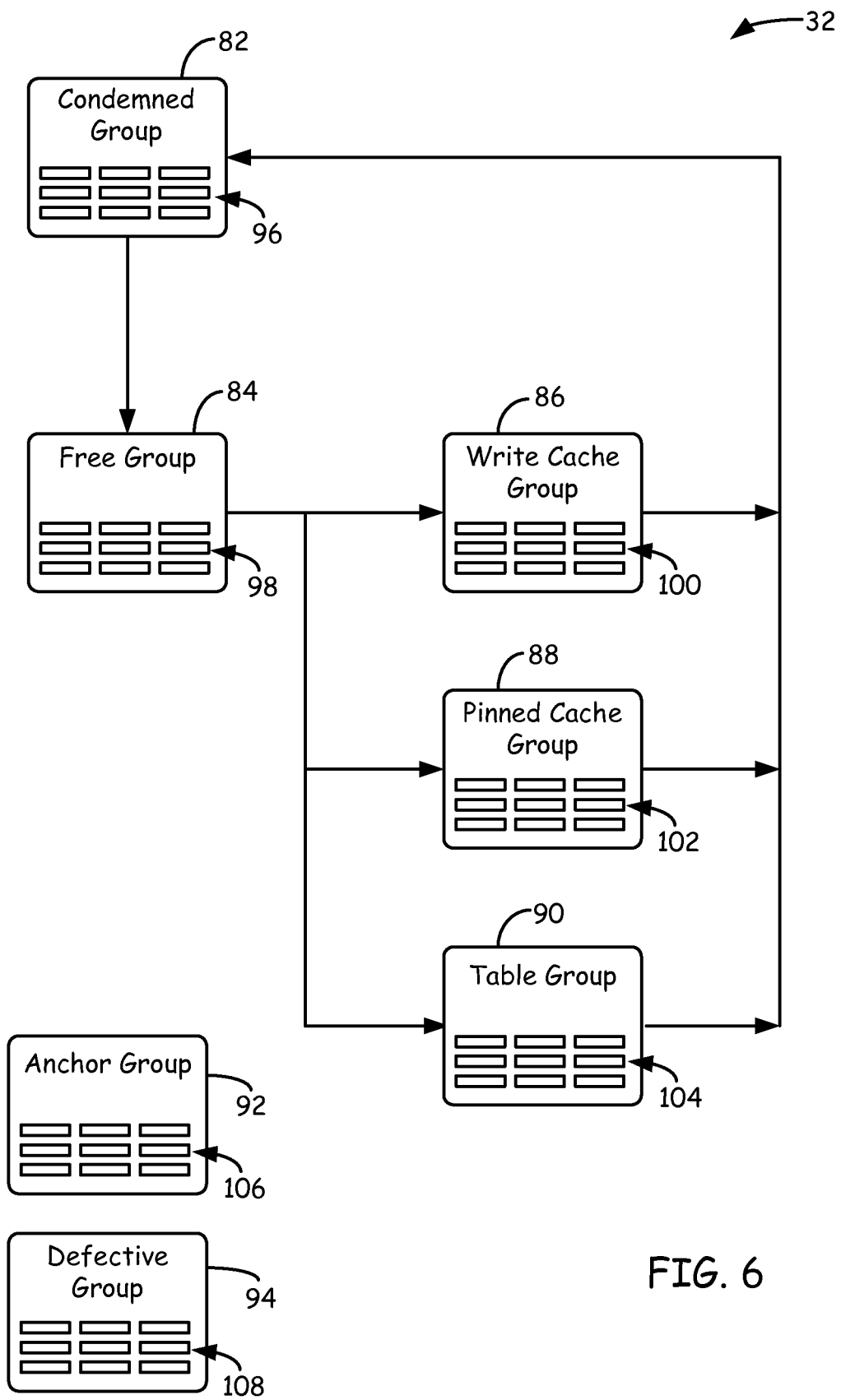
FIG. 6 is a block diagram of data blocks groupings based on the descriptor entries.

FIG. 6 is a block diagram of data blocks 32 grouped in separate categories based on the block states designated in descriptor entries 56 (shown in FIG. 2). As discussed above, each descriptor entry 56 desirably includes pointers to create separate lists of data blocks 32, thereby grouping data blocks 32 into different categories depending on the data files they retain. In the embodiment shown in FIG. 6, descriptor entries 56 group data blocks 32 into condemned group 82, free group 84, write cache group 86, pinned cache group 88, table group 90, anchor group 92, and defective group 94.

Condemned group 82 is a first group of data blocks 32 that contain data that is old and no longer needed (referred to as condemned blocks 96). For example, the data retained in condemned blocks 96 may be previous versions of data files that have been subsequently updated and/or rewritten. As such, condemned blocks 96 are in cue to be erased. As discussed above, data blocks 32 are required to be erased prior to being subsequently rewritten. Erasure operations, however, may consume significant resources of storage device 10. As a result, condemned blocks 96 may wait to be erased until predefined criteria are met, such as when storage device 10 is idle. Condemned blocks 96 may be linked together to form a list of data blocks 32, where the list may be based on a first in-first out basis.

Free group 84 is a second group of data blocks 32 received from the list of condemned group 82, and that have been erased and are available for use (referred to as free blocks 98). Free blocks 98 may also be linked together to form a list of data blocks 32. In one embodiment, the order of the list of free blocks 98 is based on a wear leveling technique. For example, the sequential list of free blocks 98 may be arranged in order of erase counts, where the free block 98 with the lowest erase count is the first data block in the serial list (i.e., the first to be used) and the free block 98 with the highest erase count is the last data block in the sequential list (i.e., the last to be used). As successive erasure operations are performed on free blocks 98, the order of free blocks 98 in free group 84 may change to accommodate changes in the relative erase counts.

Write cache group 86 and pinned cache group 88 are third and fourth groups of data blocks 32 received from the list of free group 84, and that controller 12 has subsequently written data to. The data blocks 32 in write cache group 86 (referred to as write cache blocks 100) may be linked together to form a list of data blocks 32 containing data written from the host computer. In many situations, it is desirable for controller 12 to write host data to NVM 18 rather than directly to HDA 22. For example, the spin up of storage disk 34 from an idle state may increase the time required to write data to HDA 22. In these situations, it may be faster to write host data to NVM 18 for temporary storage while storage device 10 is busy. In this process, the data transmitted from the host computer may be written to buffer 16 and then to NVM 18 for non-volatile storage. At a subsequent point in time, such as when storage device 10 is idle, storage disk 34 may be spun up and the data may be written from NVM 18 to HDA 22 (via buffer 16).

The data blocks 32 in pinned cache blocks 56 (referred to as pinned cache blocks 102) maybe be linked together to form a list of data blocks 32 containing data written from HDA 22 (i.e., pinned data), rather than from the host computer. In many situations, it is also desirable for data to be read from NVM 18 rather than from HDA 22. For example, the spin up of storage disk 34 from an idle state requires additional time before data may be read from its sector tracks. Instead, data that may be accessed frequently by the host computer may be stored on NVM 18, which does not have moving components that require mechanical latencies of any sort.

In the shown embodiment, controller 12 may treat the pinned data differently from the host data. In particular, the host data retained in write cache blocks 100 is desirably retained at least until written to HDA 22. In comparison, the pinned data retained in pinned cache blocks 102 may be erased if no longer needed because a copy is already retained in HDA 22. The use of separate serial lists for write cache group 86 and pinned cache group 88 allows controller 12 to perform actions on one group without affecting the other (e.g., cache flush commands).

Table group 90 is a fifth group of data blocks 32 received from the list of free group 84, and that controller 12 has subsequently written data to relating to FMS 48 (referred to as table blocks 104). As discussed above, first array 50 and second array 52 of FMS 48 may be copied to buffer 16 during the operation of storage device 10, thereby allowing FMS 48 to manage data transfers and access with NVM 18 and HDA 22. Accordingly, table blocks 104 are the data blocks containing stored copies of first array 50 and second array 52 in NVM 18. As such, table blocks 104 may be linked together to form a list of data blocks 32 containing the data files of first array 50 and second array 52. In addition to first array 50 and second array 52, table blocks 104 may also include an additional array of journal entries, which are updates to the first and second arrays, as discussed below.

As further shown in FIG. 6, the data blocks 32 in condemned group 82, free group 84, write cache group 86, pinned cache group 88, and table group 90 may switch categories depending on the data retained in the particular data blocks 32. For example, after first array 50 and second array 52 of FMS 48 are loaded from table blocks 104 into buffer 16 and updated with the journal entries, as discussed below, the updated version of FMS 48 may be written to back to NVM 18 for non-volatile storage. In this situation, controller 12 may obtain a first data block or data blocks of free blocks 98 (i.e., the data blocks with the lowest erasure counts) and write the updated FMS 48 (i.e., the updated first array 50 and second array 52) to these data blocks 98.

As discussed below, the pointers of descriptor blocks 56 corresponding to these written data blocks 98 may be redirected to switch these written data blocks 98 from free group 84 to table group 90 (i.e., from free blocks 98 to table blocks 104). Additionally, the table blocks 104 containing the previous version of FMS 48 may be switched from table group 90 to condemned group 82 in the same manner. The table blocks 104 containing the old version of FMS 48 may then be switched to condemned group 82 (i.e., from table blocks 104 to condemned blocks 96). At a subsequent point, the given data blocks 96 may then be erased and switched from condemned group 82 to free group 84 (i.e., from condemned blocks 96 to free blocks 98) for subsequent use. The process in which FMS 48 manages movement of data blocks 32 between the various categories with descriptor entries 56 is discussed below.

Anchor group 92 is a sixth group of data blocks 32 (referred to as anchor blocks 106), which are desirably isolated from the remaining data blocks 32 of NVM 18. Anchor blocks 106 are desirably retained in a fixed location within NVM 18 that controller 12 may locate during start up of storage device 10. Anchor blocks 106 may also be linked together to form a list, and provide a pointer to the first table block 104 in table group 90. This allows controller 12 to readily locate table blocks 104 during the start up of storage device 10, thereby allowing controller 12 to load FMS 48 into buffer 16. As discussed below, each time an updated version of FMS 48 is rewritten from buffer 16 to NVM 18, anchor blocks 16 are desirably updated to relocate the pointer to a new first table block 104 of table group 90.

Since anchor group 92 is desirably isolated from the remaining data blocks 32 of NVM 18, anchor blocks 106 may be omitted from the wear leveling technique of FMS 48. As such, NVM 18 desirably includes a suitable minimum number of anchor blocks 106 to prevent each anchor block 106 from rapidly accumulating erase counts. On the other end, anchor blocks 106 are also not reusable as free blocks 98, and therefore, deduct from the overall usable volume of NVM 18 for storing data. As such, NVM 18 also desirably includes a suitable maximum number of anchor blocks 106 that reduces storage volume loss. Examples of suitable numbers of anchor blocks 106 for use with FMS 48 range from two to fifty, with particularly suitable numbers ranging from about four to twenty, and with even more particularly suitable numbers ranging from six to ten.

Defective group 94 is a seventh group of data blocks 32 (referred to as defective blocks 108), which are also desirably isolated from the remaining data blocks 32 of NVM 18 due to their defective nature. As such, defective blocks 108 are effectively no longer used by storage device 10 and may be omitted from the usable data blocks 32.

While data blocks 32 are shown in FIG. 2 as being grouped into seven different categories, FMS 48 may alternatively operate with additional numbers of data block groups. As discussed below, the grouping of data blocks 32 in this manner provides an effective manner for managing the data writing and erasure operations with data blocks 32.

Figure 7:
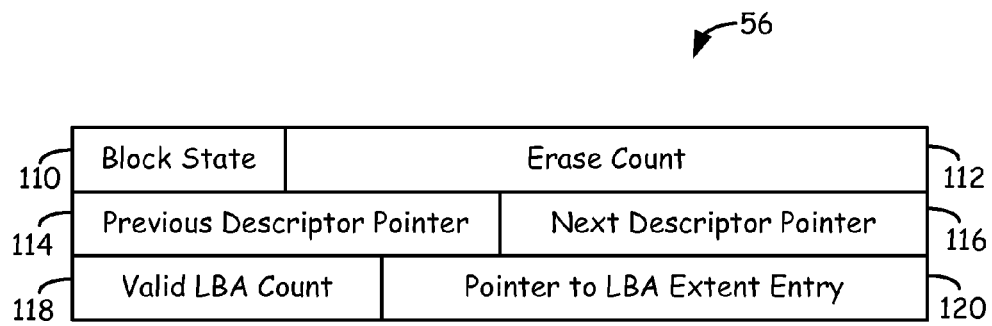
FIG. 7 is a block diagram of an exemplary descriptor entry.

FIG. 7 is a block diagram of an exemplary descriptor entry 56 of second array 52 (shown in FIG. 2). As shown, descriptor entry 56 includes descriptor files 110-120, which are data files that contain information of an associated data block 32 and for grouping the associated data blocks 32 into one of condemned group 82, free group 84, write cache group 86, pinned cache group 88, table group 90, anchor group 92, and defective group 94.

Descriptor file 110 includes information relating to the current state of the associated data block 32, where the "state" refers to which group the given data block 32 is currently linked in. Examples of suitable states for descriptor file 110 include "condemned" for condemned group 82, "free" for free group 84, "write data" for write cache group 86, "pinned data" for pinned cache group 88, "table" for table group 90, "anchor" for anchor group 92, and "defective" for defective group 94.

Descriptor file 112 includes the erase count for the associated data block 32. This allows descriptor entry 56 to be placed in the proper order in free group 84 based on erase counts of the data blocks 32. Accordingly, each time the associated data block 32 is erased, the erase count in descriptor file 112 may be incremented to maintain an accurate erase count.

Descriptor files 114 and 116 respectively include pointers to the previous and next descriptor entries 54 in the same group. These pointers allow descriptor entries 56 to switch the groups in which data blocks 32 are linked in. For example, when a given write cache block 100 is to be condemned, FMS 48 may switch the block state in descriptor file 110 of the corresponding descriptor entry 56 from "write data" to "condemned", and may also redirect the pointers in descriptor files 114 and 116 of the corresponding descriptor entry 56 to switch the link from write cache group 86 to condemned group 82.

Descriptor file 118 includes the valid LBA count of the associated data block 32, which allows FMS 48 to identify the amount of valid data files in the data block 32. Descriptor file 120 includes an additional pointer that links descriptor entry 56 to the LBA entry 54 that corresponds to the valid data file 58 retained in the lowest physical page of the data block 32 that is associated with descriptor entry 56. As discussed below, when the respective data file 58 is marked invalid (e.g., the data file 58 is rewritten to another data block 32), the pointer in descriptor file 120 allows the LBA entry 54 that corresponds to the invalid data file 58 to be removed from the list of LBA entries 54 (shown in FIG. 3). Since the invalid data file 58 is no longer needed, removing the corresponding LBA entry 54 from the list of searchable valid LBAs further reduces search times with search hardware 20.

Loading and Updating the File Management System

FIGS. 8A-8F are schematic illustrations of table blocks 104 and anchor blocks 106, which illustrate the method for loading and updating FMS 48 from table blocks 104 to buffer 16. While FMS 48 operates in buffer 16, each event in NVM 18 that changes a given data block 32 (e.g., erasures, writes, and the like) requires an update in FMS 48 to ensure that FMS 48 has the proper state for each data block 32. As such, when a particular event occurs, FMS 48 in buffer 16 may be directly updated to account for the event. At this point, however, the updated version of FMS 48 in buffer 16 now differs from the version stored in NVM 18. As such, in one embodiment, the updated version of FMS 48 in buffer 16 may be periodically written to NVM 18 for non-volatile storage, and the old version of FMS 48 may be erased.

Each write operation to store FMS 48 in NVM 18, however, can require significant resources, thereby reducing the operational efficiency of storage device 10. Instead, in an alternative embodiment, the updated version of FMS 48 may be written to NVM 18 during a single write operation. After that single write operation, journal entries may be created to record any subsequent event that changes one or more data blocks 32. Each journal entry may initially be retained in buffer 16 until a trigger event occurs, such as after a predetermined number of journal entries are created. When the trigger even occurs, the created journal entries may then be written to NVM 18 for non-volatile storage. Delaying the writing of the journal entries until a trigger event occurs further reduces the impact on the memory bandwidth of storage device 10.

FMS 48 may include a variety of different trigger events to write the journal entries to NVM 18. In one embodiment, the trigger event may include the creation of a predetermined number of journal entries, as mentioned above. Each journal entry retains information regarding a change in state of a given data block 32 (e.g., the erasure of a data block 32). Therefore, each journal entry may be small in size (e.g., about 64 bytes), and a substantial number of journal entries may be retained in buffer 16 without substantially affecting the storage volume in buffer 16. Examples of suitable numbers of journal entries that may be created in buffer 16 before triggering a write event range from about 50 journal entries to about 1,000 journal entries, with particularly suitable numbers ranging from about 100 journal entries to about 500 journal entries. For example, the journal entries may be accumulated until a particular size is reached (e.g., 2-4 kilobytes).

After the journal entries are stored on NVM 18, the updated FMS 48 may then be recreated during the next start up of storage device 10. As discussed below, after first array 50 and second array 52 of FMS 48 are loaded from NVM 18 into buffer 16, the journal entries may then be sequentially loaded to buffer 16 to update the loaded FMS 48. The journal entries are desirably stored in NVM 18 and loaded to buffer 16 in the same sequential order that they were created in to accurately recreate the updated FMS 48. After FMS 48 is updated with the journal entries, the same process may then be repeated to maintain an updated FMS 48 while also preserving the memory bandwidth of storage device 10.

Figure 8A:
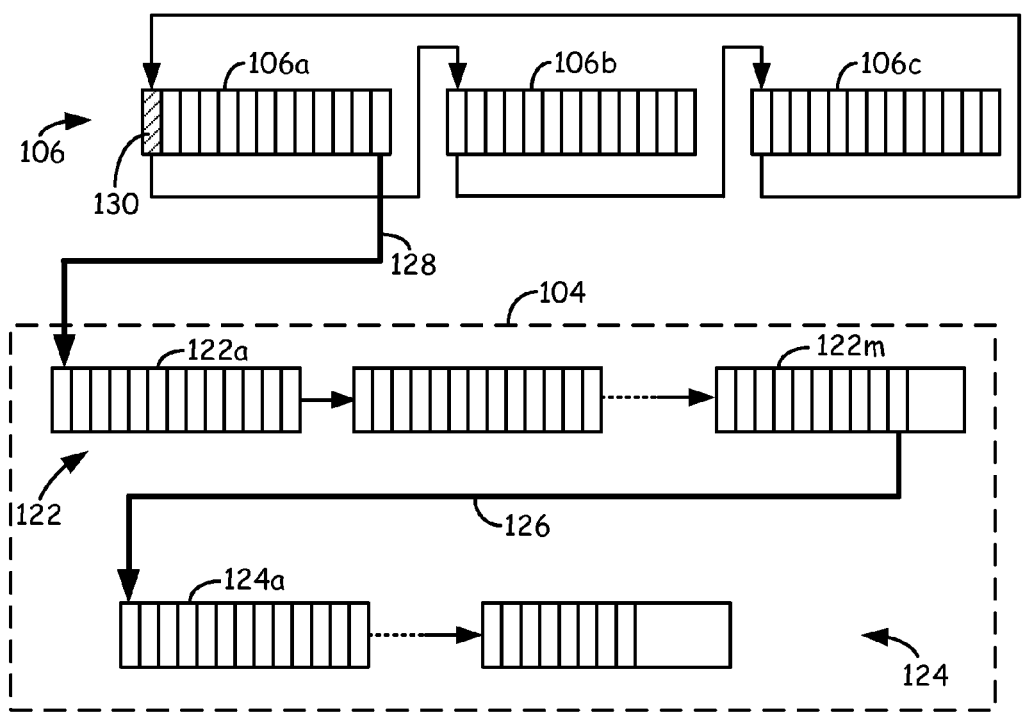
FIGS. 8A-8F are schematic illustrations of data blocks of a solid-state medium of the data storage device, depicting the method of loading and updating the file management system.

As shown in FIG. 8A, table blocks 104 include array blocks 122 and journal entry blocks 124, where journal entry blocks 124 are linked to array blocks 122 with pointer 126. Array blocks 122 are the data blocks that include first array 50 and second array 52 (shown in FIG. 2). The number of array blocks 122 required to store the first and second arrays may vary depending on the lengths of first array 50 and second array 52.

Journal entry blocks 124 include an array of journal entries, which are updates to LBA entries 54 of first array 50 and to descriptor entries 56 of second array 52. The number of journal entry blocks 124 required to store the journal entry array may also vary depending on the length of the journal entry array. As further shown in FIG. 8A, pointer 126 links the last data block of array blocks 122 (referred to as array block 122m) the first data block of journal entry blocks 124 (referred to as journal entry block 124a).

In the shown example, anchor blocks 106 include three anchor blocks 106a, 106b, and 106c linked in a closed loop list such that the last anchor block 106c links back to the first anchor block 106a. As further shown, anchor block 106a includes pointer 128 and marked page 130, where pointer 128 links anchor block 106a to the first data block of array blocks 122 (referred to as array block 122a). Marked page 130 is a marker that allows controller 12 to identify which anchor block 106 contains the active pointer 128. As a result, anchor blocks 106 are desirably set such that only a single anchor block 106 includes a marked page (e.g., marked page 130) at any given time.

During start up of storage device 10, controller 12 may scan anchor blocks 106 to identify the marked anchor block 106 (i.e., the anchor block containing marked page 130, which is anchor block 106a in the current example). Controller 12 may then follow pointer 128 from anchor block 106a to array block 122a to identify the location of array blocks 122 in NVM 18. The data files of FMS 48 (i.e., first array 50 and second array 52) may then be loaded from array blocks 122 to buffer 16. In particular, controller 12 may read and write the data files from array block 122a, then link to the next successive array blocks 122, and perform the same reading and writing operations until all of the data files in array blocks 122 are written to buffer 16.

After the data files of FMS 48 are written to buffer 16, controller 12 may then follow pointer 126 from array block 122m to journal entry block 124a, and read the journal entry array of journal entry blocks 124 to buffer 16. In particular, controller 12 may read and write the data files from journal entry block 124a, then link to the next successive journal entry blocks 124, and perform the same reading and writing operations until all of the data files in journal entry blocks 124 are written to buffer 16. As discussed below, this updates LBA entries 54 and descriptor entries 56 of FMS 48 with the information retained in the journal entries, in the order that they were created, thereby providing an updated FMS 48 for use in subsequent reading and writing operations with NVM 18 and HDA 22.

After FMS 48 is updated in buffer 16, the updated version may be written back to NVM 18 and/or HDA 22 for non-volatile storage. The writing operation may be performed after on one or more trigger events occur, such as after a predetermined number of journal entries are created. Alternatively, the writing operation may be performed at any time after FMS 48 is updated.

Figure 8B:
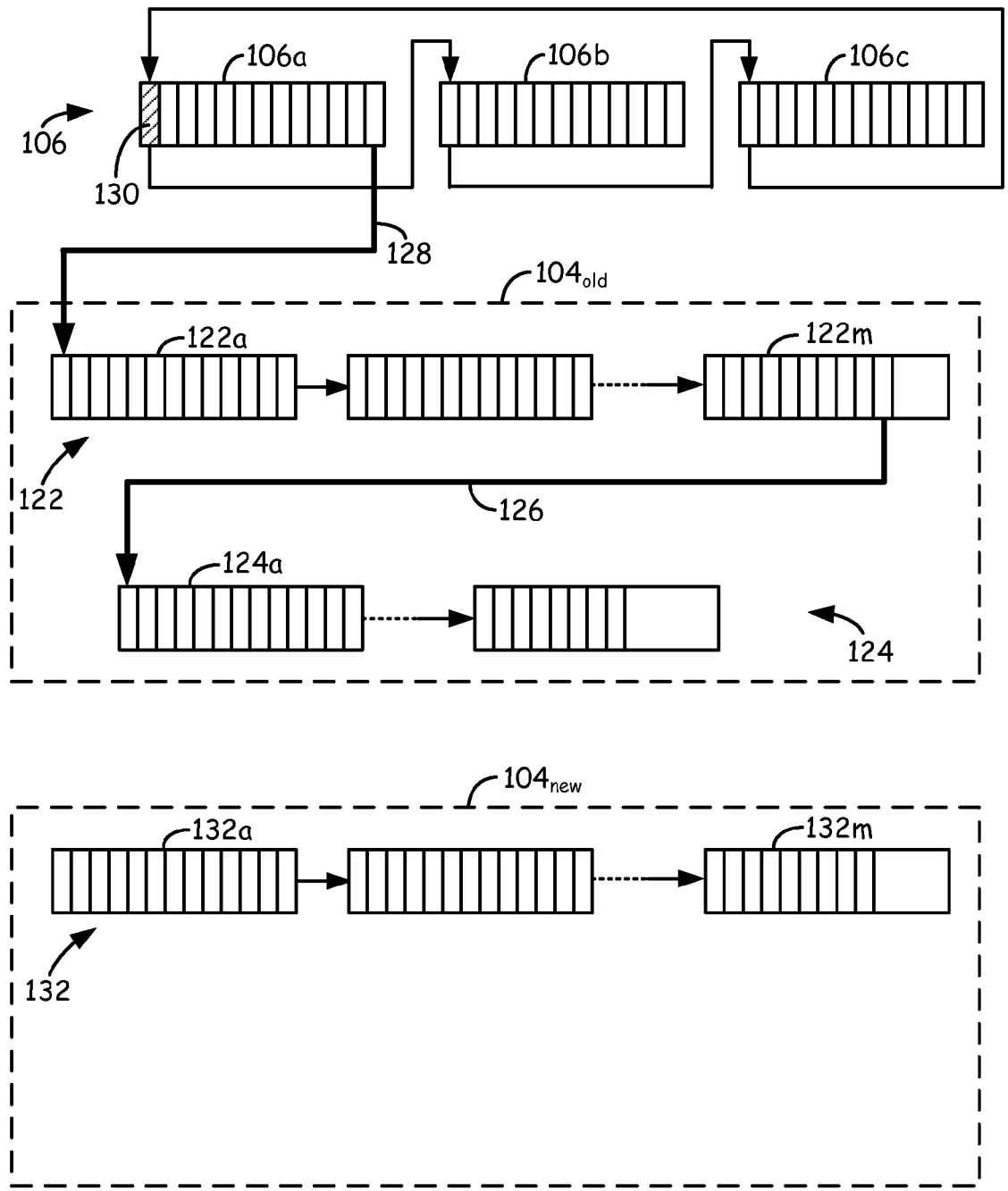

As shown in FIG. 8B, when the new, updated version of FMS 48 is written to NVM 18, NVM 18 retains two versions of FMS 48 contained in separate table blocks 104, referred to as table blocks $104_{old}$ and table blocks $104_{new}$. In this example, table blocks $104_{old}$ refer to table blocks 104 shown above in FIG. 8A, which contain the old version of FMS 48, and table blocks $104_{new}$ contain the new version of FMS 48. As shown in FIG. 8B, table blocks $104_{new}$ include includes array blocks 132, which contain the updated versions of first array 50 and second array 52, and may function in the same manner as array blocks 122.

The updated version of FMS 48 may be written to table blocks $104_{new}$ by initially identifying the first free block 98 in the list of free group 84. Controller 12 may then write the updated version of FMS 48 to the first free block 98 until the first free block 98 is filled. The next successive free blocks 98 in free group 84 may then be identified and written to until all of the data files of the updated FMS 48 are written to NVM 18. Each filled block desirably includes a pointer to the next data block in the list to link the filled blocks.

Figure 8C:
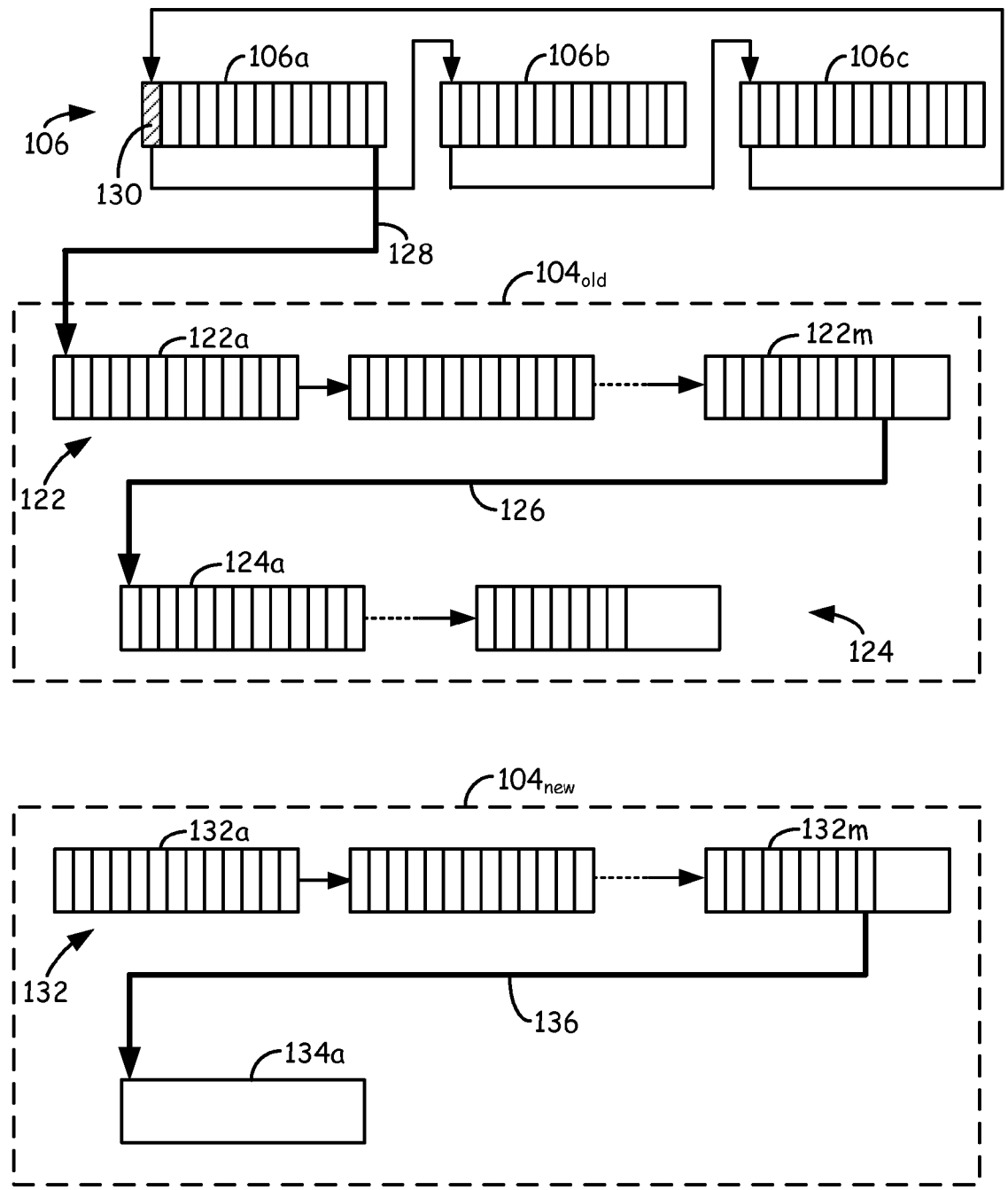

As shown in FIG. 8C, after array blocks 132 are written to, an additional free block 98 may be identified for use as journal entry block 134a. This may be performed by generating pointer 136 from the last array block 132 of the updated FMS 48 (referred to as array block 132m) to journal entry block 134a.

Figure 8D:
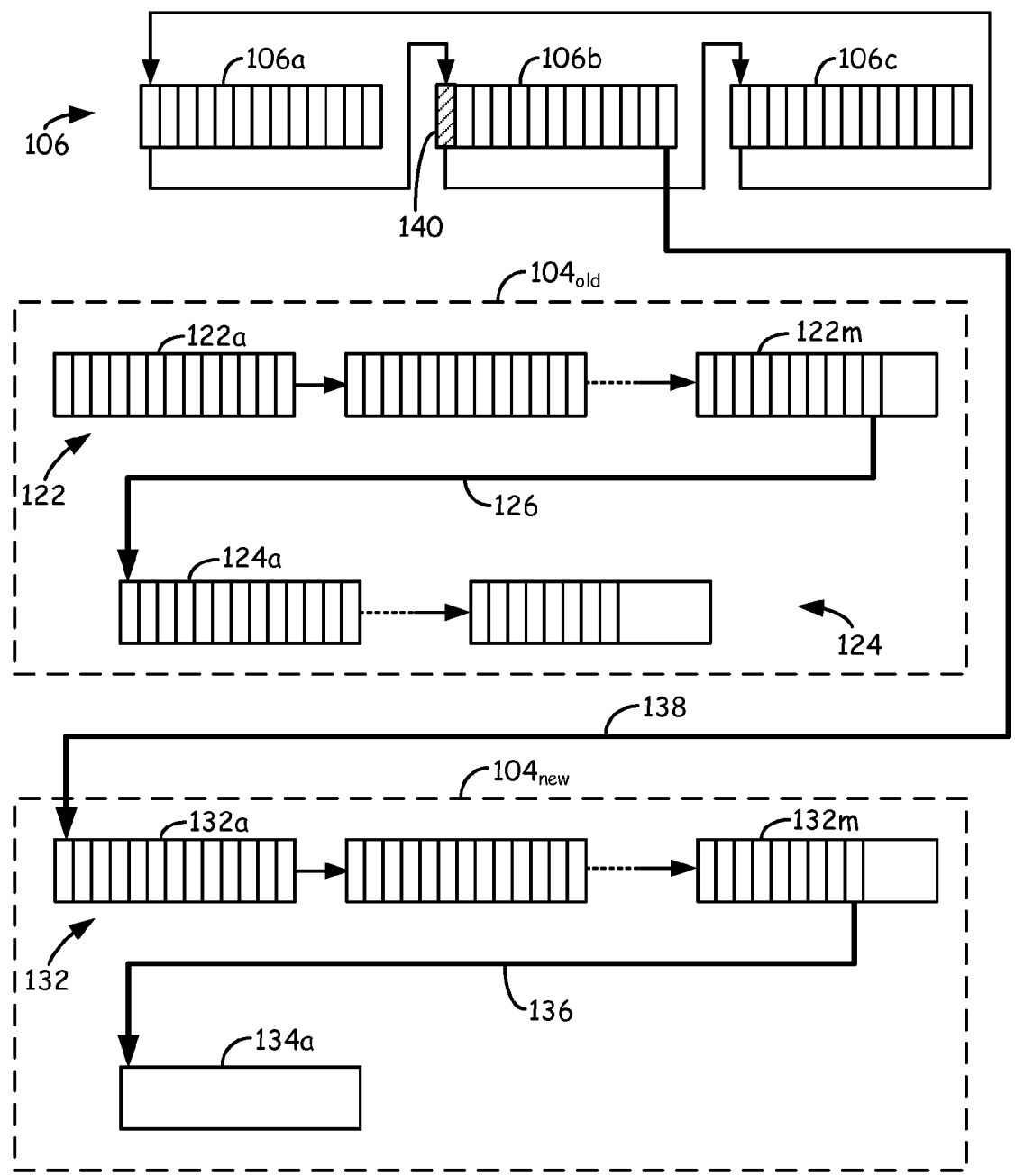

As shown in FIG. 8D, after array blocks 132 are written to, the next anchor block 106 in the closed-loop list of anchor group 92 is marked as the marked anchor block containing the active pointer. In the current example, pointer 138 and marked page 140 are written to anchor block 106b. This allows controller 12 to identify anchor block 106b as containing the active pointer 138 to the updated FMS 48 stored in table blocks $104_{new}$. Accordingly, pointer 138 may be created from anchor block 106b to the first array block 132 (referred to as array block 132a) to link anchor block 106b to array block 132a. After anchor block 106b is marked, anchor block 106a may be erased to remove marked page 130 and pointer 128. This reduces the risk of controller 12 identifying more than one anchor blocks 106 as containing the active pointer to the updated FMS 48.

Since the operation of FMS 48 is desirably transparent to the host computer, LBA ranges are typically not associated with table blocks 104 and anchor blocks 106. Thus, LBA entries 54 are not required to be created when writing the updated version of FMS 48 to table blocks $104_{new}$. However, each of the above-discussed steps changes the states of table blocks 104 and anchor blocks 106 with respect to the associated descriptor entries 56. As such, FMS 48 in buffer 16 maybe updated to account for these changes to descriptor entries 56. In addition, journal entries may be created and stored in buffer 16 that record the changes in the descriptor entries 56. The update to FMS in buffer 16 and the creation of the journal entries in buffer 16 may be performed at any pointer before, during, or after the writing/erasure operations.

For example, since data was written to array block 132a, the descriptor entry 56 associated with array block 132a may be updated to switch the state of array block 132a from "free" to "table", and the pointers in the descriptor entry 56 may be redirected to link the descriptor entry 56 from free group 84 to table group 90. The same process may then be repeated for each data file written to NVM 18.

Figure 8E:
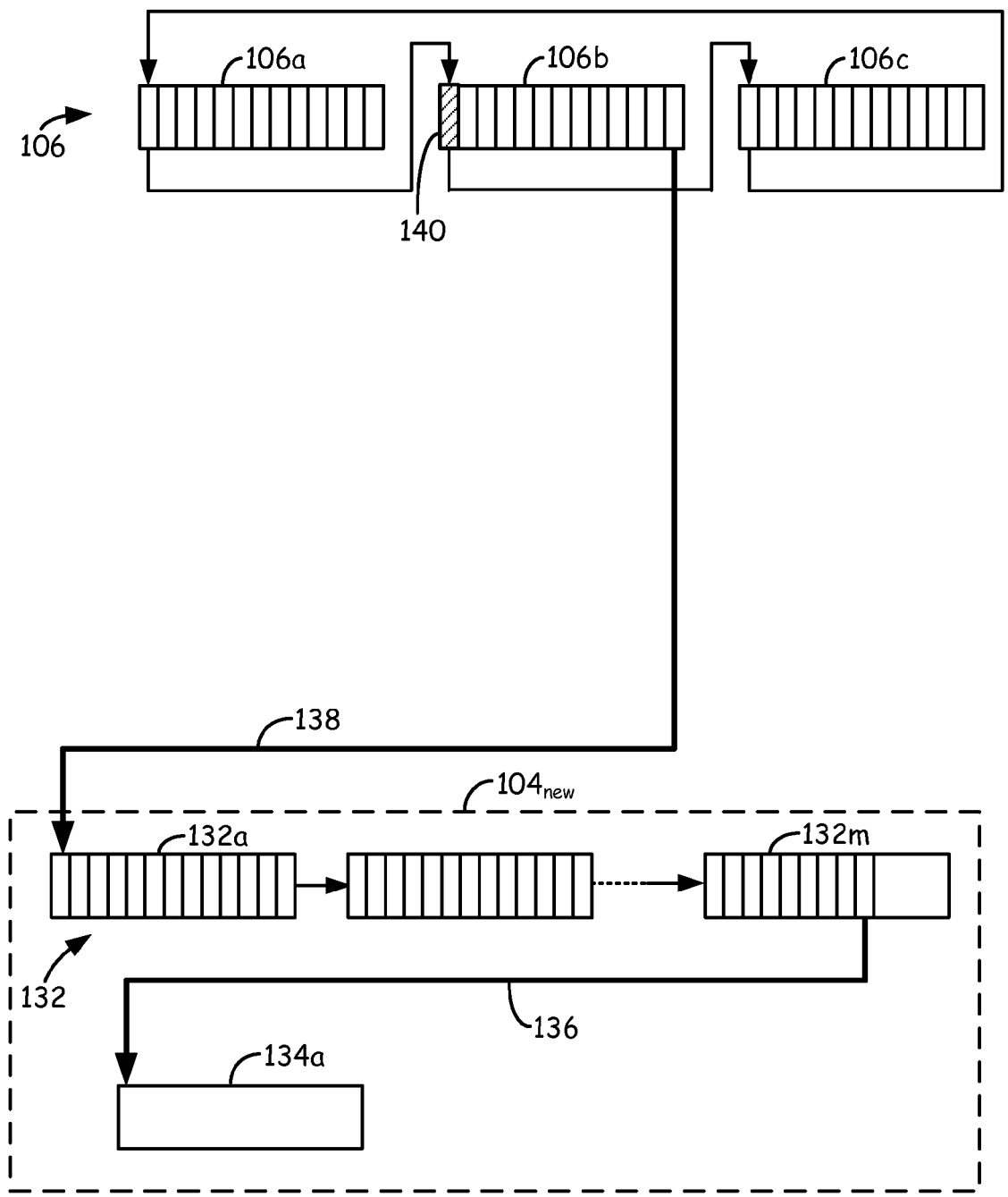

As shown in FIG. 8E, once the updated FMS 48 is written to table blocks $104_{new}$, the old version of FMS 48 in table blocks $104_{old}$ may be switched to condemned group 82 for erasure. As such, FMS 48 in buffer 16 may be updated to account for these changes, and journal entries may be created and stored in buffer 16 that record the changes in the associated descriptor entries 56. For example, the descriptor entries 56 associated with table blocks $104_{old}$ are updated to switch the state of the data blocks from "table" to "condemned", and the pointers in the descriptor entries 56 may be redirected to link the descriptor entries 56 from table group 90 to condemned group 82.

Figure 8F:
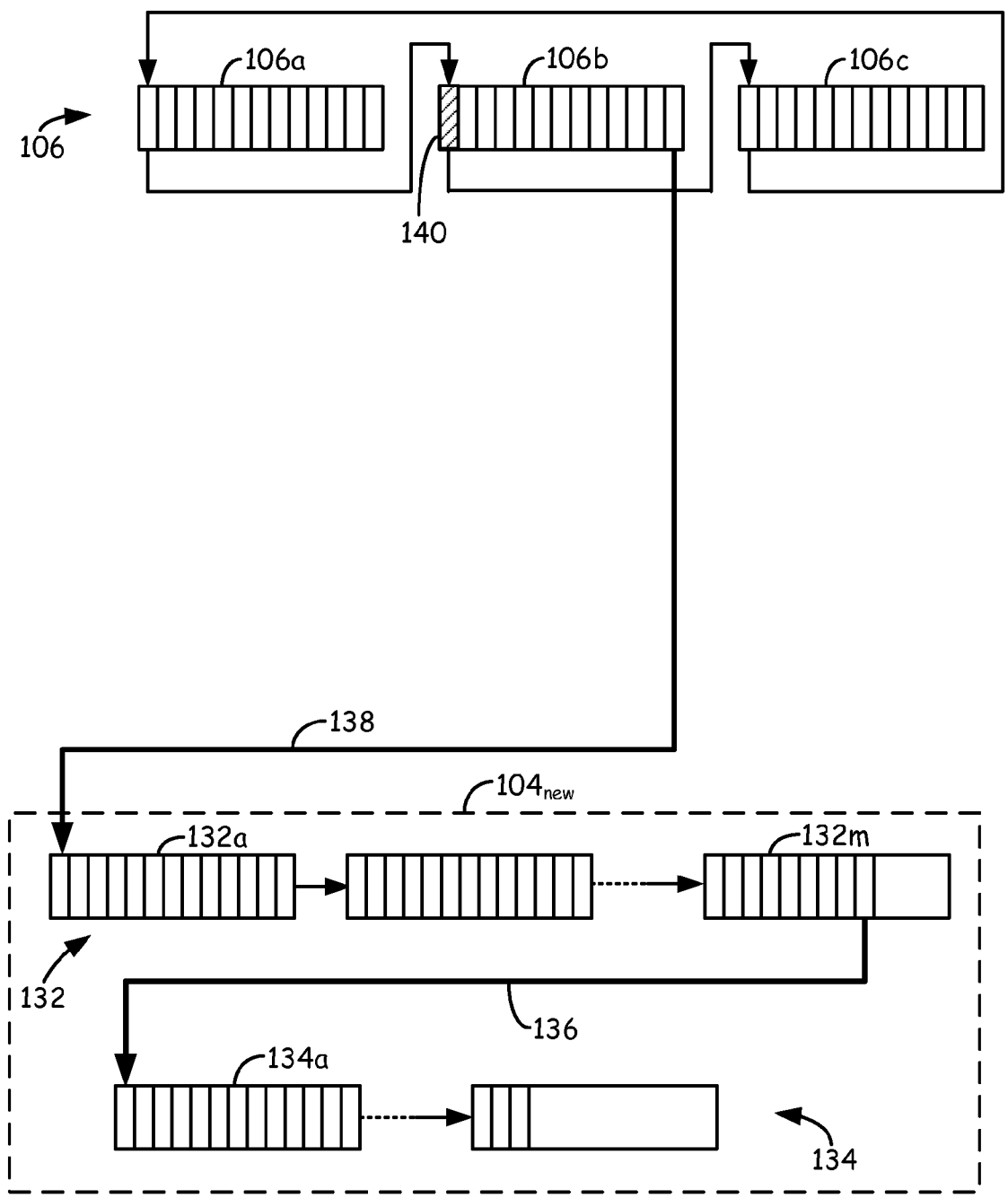

As shown in FIG. 8F, as subsequent changes occur to data blocks 32, additional journal entries may be written in buffer 16. After a trigger event occurs, the journal entries may then be written to journal entry block 134a. When journal entry block 134a is eventually filled with journal entries, additional free blocks 98 may be obtained and linked to journal entry block 134a to continue the array of journal entries in subsequent journal entry blocks 134. FMS 48 in buffer 16 may be updated to account for these changes, and journal entries may be created and stored in buffer 16 that record the changes in the descriptor entries 56 associated with the journal entry blocks 134 being written to. This allows subsequent journal entries written to journal entry blocks 134 to be loaded into buffer 16 with array blocks 132 during the next loading process (e.g., during the next start up of storage device 10).

Example Operations of the File Management System

Figure 9A:
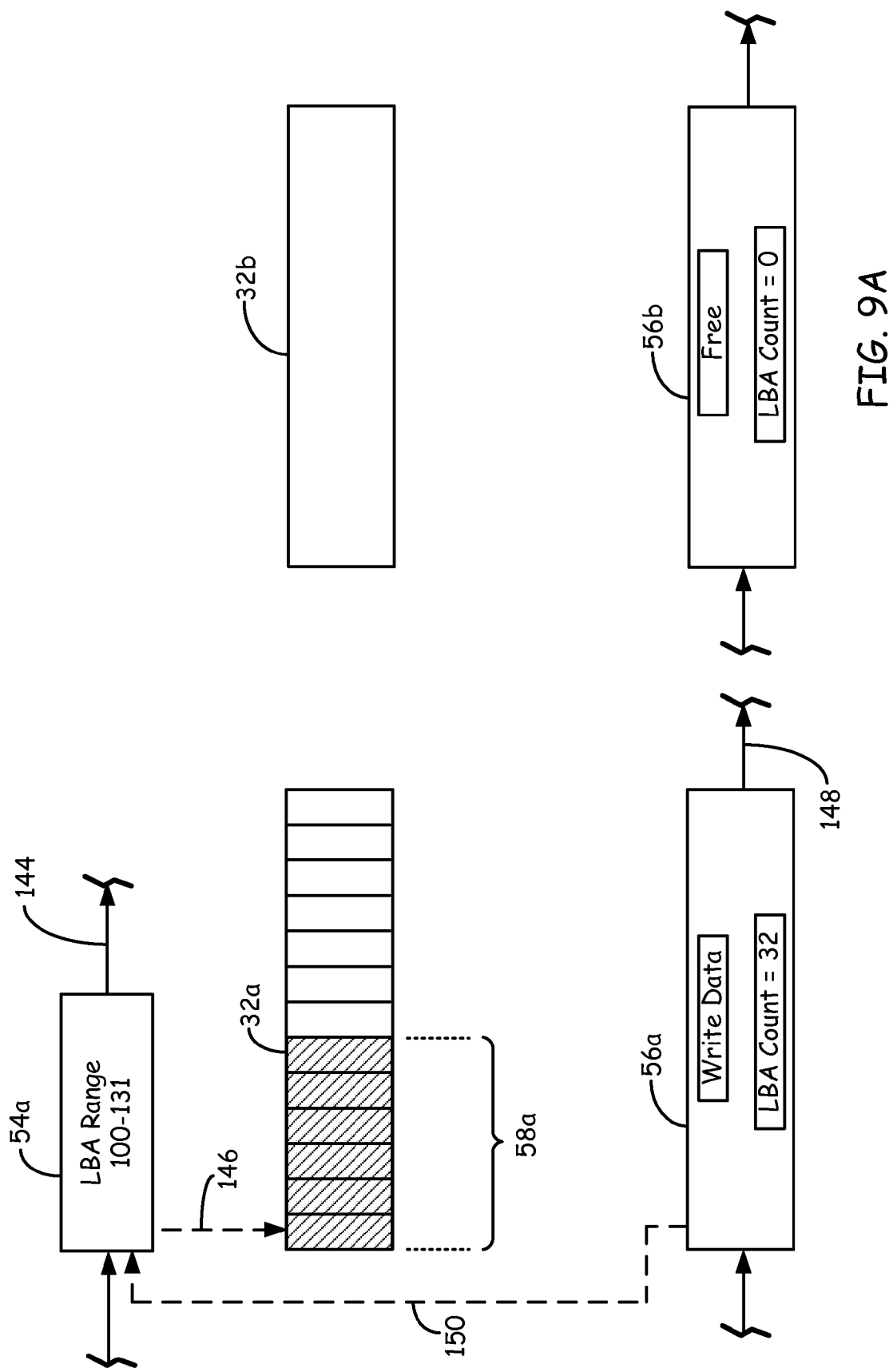

FIGS. 9A-9F are schematic illustrations depicting a method in which FMS 48 may manage data blocks 32 of NVM 18. As shown in FIG. 9A, in the current example, data file 58a corresponding to LBAs 100-131 is being written from the host computer to NVM 18 for temporary, non-volatile storage (e.g., while storage disk 34 of HDA 22 is idle). This may initially involve obtaining the data block 32 in free group 84 having the lowest erasure count (referred to as data block 32a). LBA entry 54a covering LBAs 100-131 may then be created in buffer 16 (i.e., FMS 48 in buffer 16 is updated with LBA entry 54a).

LBA entry 54a may include the starting LBA address for data file 58a (i.e., "100") and the length of the LBA range for data file 58a (i.e., "32"). LBA entry 54a may also include pointer 144 to insert LBA entry 54a in the linked list of LBA entries 54 in numerical LBA order. For ease of discussion, the following discussion omits the "previous pointers" from LBA entries 54 and descriptor blocks 56 with the understanding that LBA entries 54 and descriptor entries 56 may include "previous pointers" and "next pointers" to create lists, as discussed above. LBA entry 54*a* also desirably includes the physical block address of data block 32*a* and the page address within data block 32*a* of the first page in which data file 58*a* is to be stored (i.e., page 1) (represented by arrow 146).

The descriptor entry 56 in buffer 16 associated with data block 32*a* (referred to as descriptor entry 56*a*) may also be updated to account for the data writing operation. For example, as shown in FIG. 9A, the block state descriptor entry 56*a* may switch from "free" to "write data", and descriptor pointer 148 may be redirected to switch descriptor block 56*a* from free group 84 to write cache group 86. Additionally, the valid LBA count in descriptor entry 56*a* may be increased from "0" to 32", as shown.

Furthermore, pointer 150 may be added to descriptor entry 56*a*, which provides a link between descriptor entry 56*a* and LBA extent 54*a*. As discussed above, pointer 150 desirably links descriptor entry 56*a* to the LBA entry 54 that corresponds to the valid data file 58 retained in the lowest physical page of the data block 32 that is associated with descriptor entry 56*a*. In the current example, data block 32*a* is associated with descriptor entry 56*a*, and data file 58*a* is the valid data file retained in the lowest physical page in data block 32*a* (i.e., page 1). LBA entry 54*a* is the LBA entry 54 that corresponds to data file 58*a*. As such, pointer 150 links descriptor entry 56*a* to LBA entry 54*a*.

Data file 58*a* may be written to the first 32 pages of data block 32*a* before, during, or after LBA entry 54*a* is created and/or descriptor entry 56*a* is updated. One or more journal entries may also be created in buffer 16 to record the writing of data file 58*a* to data block 32*a*, to record the creation of LBA entry 54*a*, and to record the update to descriptor entry 56*a*. As discussed above, the journal entries may be written to NVM 18 at a subsequent point in time, such as when a trigger event occurs.

Figure 9B:
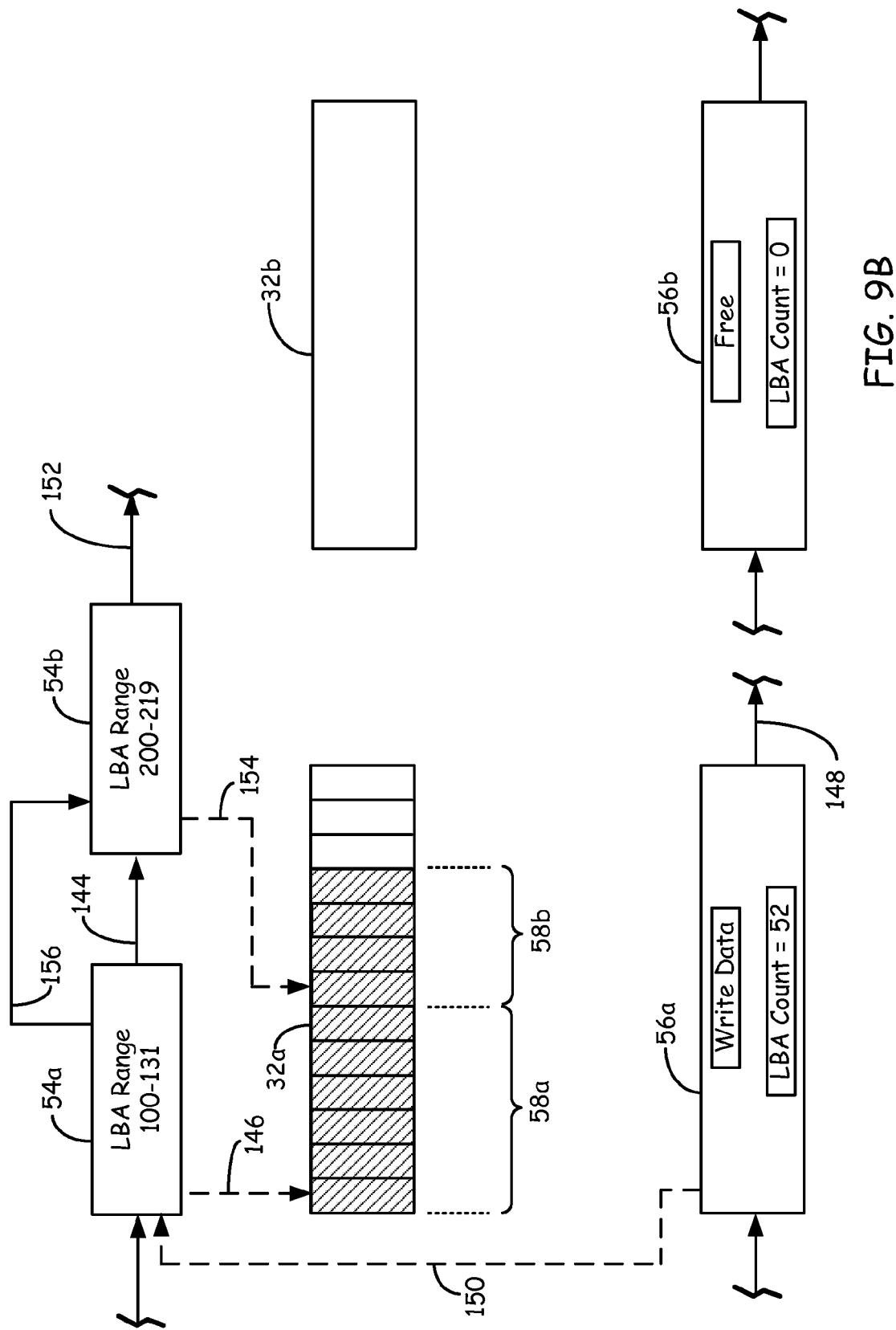

As shown in FIG. 9B, data file 58*b* corresponding to LBAs 200-219 is now being written from the host computer to NVM 18. At this point, since data block 32*a* has free pages remaining (i.e., the valid LBA count is not maxed out), data block 32*a* may still be used for this writing operation. However, since this is a new data file, a new LBA entry 54 may be created in buffer 16 for LBAs 200-219 (referred to as LBA entry 54*b*). LBA entry 54*b* may include the starting LBA address for data file 58*b* (i.e., "200") and the length of the LBA range for data file 58*b* (i.e., "20"). LBA entry 54*b* may also include pointer 152 to insert LBA entry 54*b* in the linked list of LBA entries 54 in numerical LBA order. In the example shown in FIG. 9B, LBA entries 54*a* and 54*b* are adjacent LBA entries 54. As such, pointer 144 may be redirected to directly link LBA entries 54*a* and 54*b* (and LBA entry 54*b* may include a reciprocating pointer, as discussed above).

LBA entry 54*b* also desirably includes the physical block address of data block 32*a* and the page address within data block 32*a* of the first page in which data file 58*b* is to be stored (represented by arrow 154). Additionally, LBA entry 54*a* may include pointer 156, which may point to the LBA entry 54 that contain the data file 58 that is located physically adjacent to data file 58*a*. In the current example, data file 58*b* is located physically adjacent to data file 58*a*. As a result, pointer 156 may point to LBA entry 54*b*. As discussed above, this allows LBA entries 54 of data files 58 that are physically adjacent to each other to readily identified, such as for cache flushing operations.

Descriptor entry 56*a* in buffer 16 may also be updated to account for this data writing operation. Since data block 32*a* already contains data file 58*a*, the only update to descriptor entry 56*a* that needs to be made involves increasing the valid LBA count from "32" to "52", as shown. It is noted that, since data file 58*b* is not retained in the lowest physical page of the data block 32 that is associated with descriptor entry 56*a*, pointer 150 does not change.

Data file 58*b* may be written to data block 32*a* before, during, or after LBA entry 54*a* is created and/or descriptor entry 56*a* is updated. One or more additional journal entries may also be created in buffer 16 to record the writing of data file 58*b* to data block 32*a*, to record the creation of LBA entry 54*b*, to record the update to LBA entry 54*a*, and to record the update to descriptor entry 56*a*.

As shown in FIG. 9C, data file 58*c* corresponding to LBAs 150-169 is now being written from the host computer to NVM 18. At this point, since data block 32*a* has free pages remaining (i.e., the valid LBA count is not maxed out), data block 32*a* may still be used for this writing operation. However, since this is a new data file, a new LBA entry 54 may be created in buffer 16 for LBAs 150-169 (referred to as LBA entry 54*c*). LBA entry 54*c* may include the starting LBA address for data file 58*c* (i.e., "150") and the length of the LBA range for data file 58*b* (i.e., "20").

LBA entry 54*c* may also include pointer 158 to insert LBA entry 54*c* in the linked list of LBA entries 54 in numerical LBA order. In the example shown in FIG. 9B, LBA entry 54*c* is numerically between LBA entries 54*a* and 54*b*. As such, pointers 144 and 158 and may be redirected to directly link LBA entry 54*c* between LBA entries 54*a* and 54*b*, as shown.

LBA entry 54*c* also includes the physical block address of data block 32*a* and the page address within data block 32*a* of the first page in which data file 58*c* is to be stored (represented by arrow 160). Additionally, LBA entry 54*b* may include pointer 162, which may point to the LBA entry 54 that contain the data file 58 that is located physically adjacent to data file 58*b*. In the current example, data file 58*c* is located physically adjacent to data file 58*b*. As a result, pointer 162 may point to LBA entry 54*c*. Moreover, despite the reordering of LBA entries 54*a*, 54*b*, and 54*c*, pointer 156 remains linked from LBA entry 54*a* to LBA entry 54*b* since data file 58*b* remains physically adjacent to data file 58*a*.

Descriptor entry 56*a* in buffer 16 may also be updated to account for this data writing operation. Since data block 32*a* already contains data files 58*a* and 58*b*, the only update to descriptor entry 56*a* that needs to be made involves increasing the valid LBA count from "52" to "64", as shown. Additionally, because data block 32*a* does not contain enough free pages to fully write data file 58*c*, the next data block 32 in free group 84 having the lowest erasure count (referred to as data block 32*b*) may be obtained.

The descriptor entry 56 in buffer 16 associated with data block 32*b* (referred to as descriptor entry 56*b*) may also be updated to account for the data writing operation. For example, as shown in FIG. 9C, the block state descriptor entry 56*b* may switch from "free" to "write data", and descriptor pointer 164 may be redirected to switch descriptor block 56*b* from free group 84 to write cache group 86. The valid LBA count in descriptor entry 56*a* may also be increased from "0" to "8", as shown. Additionally, pointer 148 of descriptor entry 56*a* may be positioned to link to descriptor entry 56*b* since both descriptor entries 56*a* and 56*b* are now in the list of write cache group 86.

Furthermore, pointer 166 may be added to descriptor entry 56*b*, which provides a link between descriptor entry 56*b* and LBA extent 54*c*. As discussed above, pointer 166 desirably links descriptor entry 56*b* to the LBA entry 54 that corresponds to the valid data file 58 retained in the lowest physical page of the data block 32 that is associated with descriptor entry 56b. In the current example, data block 32b is associated with descriptor entry 56b, and data file 58c is the valid data file retained in the lowest physical page in data block 32b (i.e., page 1). LBA entry 54c is the LBA entry 54 that corresponds to data file 58c. As such, pointer 166 links descriptor entry 56b to LBA entry 54c.

Data file 58c may be written to data block 32a and 32b before, during, or after LBA entry 54c is created and/or descriptor entries 56a and 56b are updated. One or more additional journal entries may also be created in buffer 16 to record the writing of data file 58c to data blocks 32a and 32b, to record the creation of LBA entry 54c, to record the updates to LBA entries 54a and 54c, and to record the updates to descriptor entries 56a and 56b.

During subsequent operation of storage device 10, the host computer may request data file 58a corresponding to LBAs 100-131 to be read from NVM 18. Search hardware 20 may search LBA entries 54, as discussed above, until LBA entry 54a is identified as having the desired LBA range. Based on the physical block address and page address in LBA entry 54a, the firmware may then locate data block 32a and read data file 58a into buffer 16, and then transmit data file 58a through host interface 24 to the host computer.

Similarly, when host computer requests data file 58b corresponding to LBAs 200-219, search hardware 20 may search LBA entries 54 until LBA entry 54b is identified as having the desired LBA range. As discussed above, regardless of the order in which data files 54a, 54b, and 54c are written to NVM 18, LBA entries 54 may be provided in numerical LBA order to reduce the complexity of searching with search hardware 20. Based on the physical block address and page address in LBA entry 54b, the firmware may then locate data block 32a and read data file 58b into buffer 16, and then transmit data file 58b through host interface 24 to the host computer.

Finally, when host computer requests data file 58c corresponding to LBAs 150-169, search hardware 20 may search LBA entries 54 until LBA entry 54c is identified as having the desired LBA range. Based on the physical block address and page address in LBA entry 54c, the firmware may then locate data block 32a and read data file 58c into buffer 16. In this example, however, data file 58c extends into data block 32b. Data block 32b may be located by reviewing the information in descriptor entries 56a and 56b. In particular, the firmware may identify that descriptor entry 56b is the next descriptor entry 56 from descriptor entry 56a. Because each descriptor entry 56 is desirably associated with a single data block 32, data block 32b may then be identified as the next data block 32 from data block 32a, and as the data block 32 containing the remaining portion of data file 58c. The firmware may then locate data block 32b and read the remaining portion of data file 58c into buffer 16. Data file 58b may then be transmitted through host interface 24 to the host computer.

When a particular data file 58 is no longer needed, such as data file 58a, the valid LBA count in descriptor entry 56a may be reduced by the number of LBAs of data file 58a (i.e., by 32). LBA entry 54a may then be identified through pointer 150 as the LBA entry 54 containing the LBA range for data file 58a.

Figure 9D:
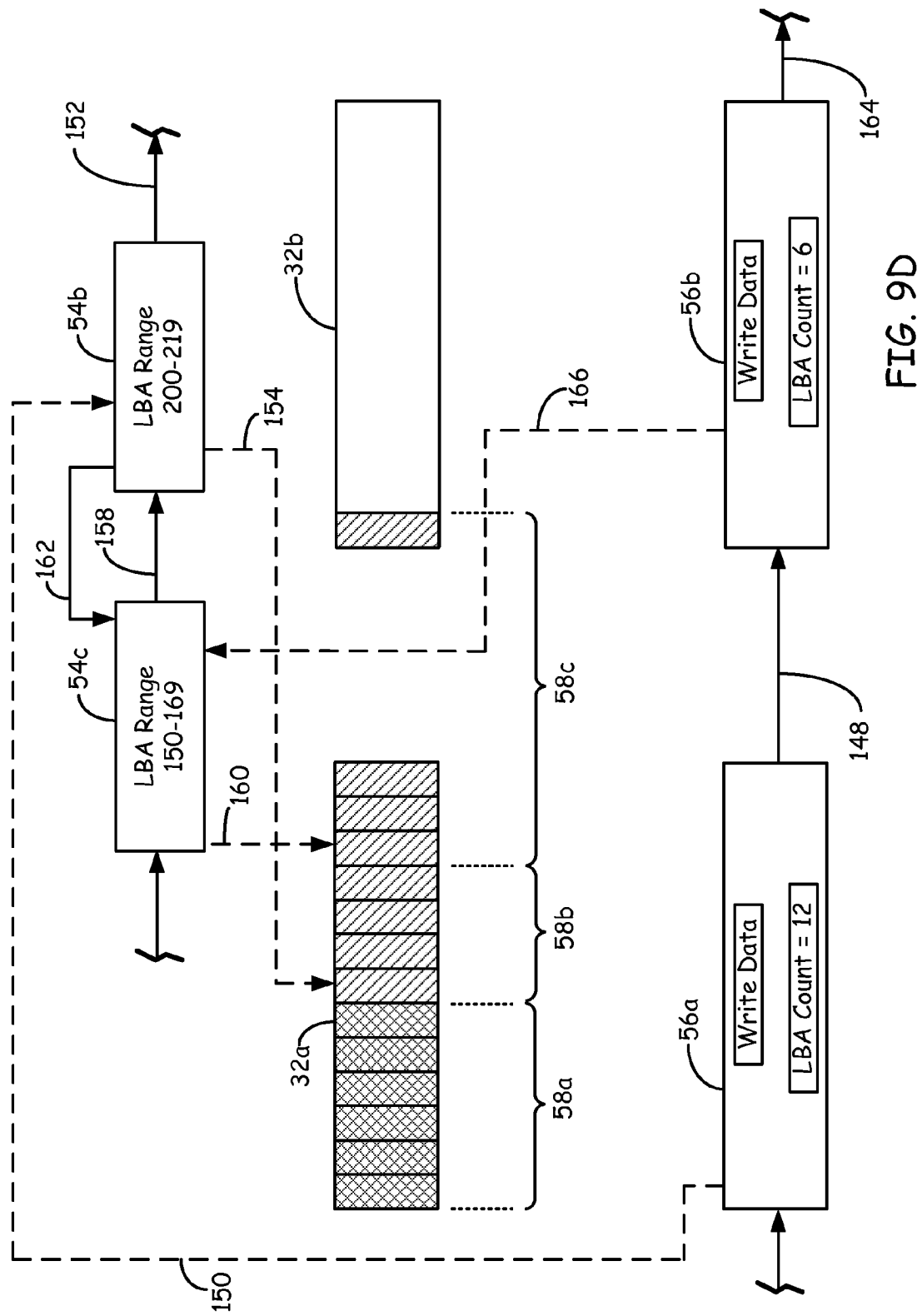

As shown in FIG. 9D, LBA entry 54a may then be removed from the list of LBA entries 54 and the remaining LBA entries 54 may be re-linked to maintain the numerical LBA order. This effectively removes data file 58a from the list of searchable data files 58, thereby reducing the size of the mapping table of LBA entries 54.

Additionally, since data file 58a is no longer valid, data file 58b is now the valid data file 58 retained in the lowest physical page of data block 32a. As such, as shown in FIG. 9D, pointer 150 may be redirected to LBA entry 54b, which is the LBA entry 54 corresponding to data file 58b. One or more journal entries may also be created in buffer 16 to record the invalidation of data file 58a, to record the removal of LBA entry 54a, to record the updates to descriptor entry 56a.

Similarly, when data file 58b is no longer needed, the valid LBA count in descriptor entry 56a may again be reduced by the number of LBAs of data file 58a (i.e., by 20). LBA entry 54b may then be identified through pointer 150 as the LBA entry 54 containing the LBA range for data file 58b.

Figure 9E:
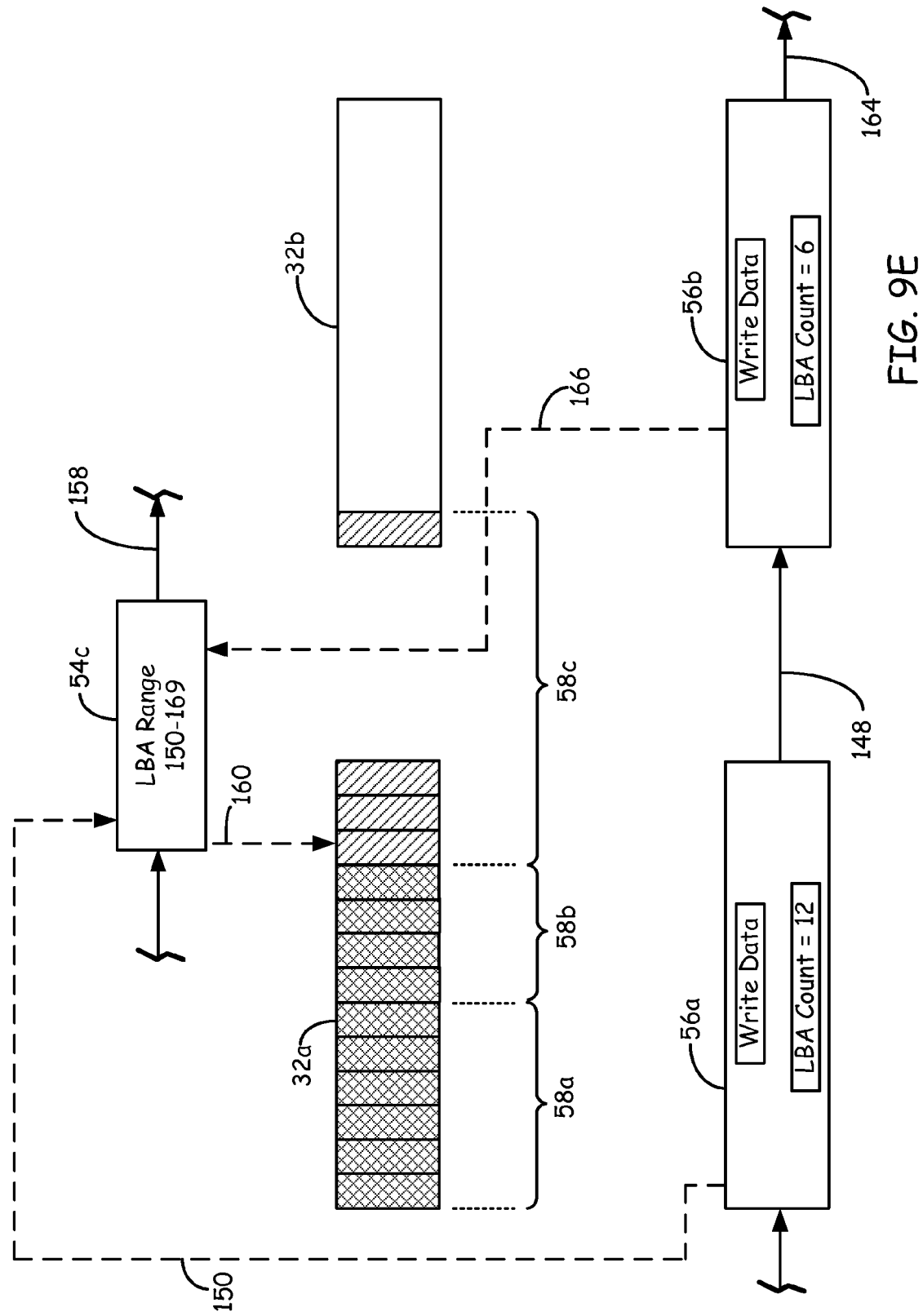

As shown in FIG. 9E, LBA entry 54b may then be removed from the list of LBA entries 54 and the remaining LBA entries 54 may be re-linked to maintain the numerical LBA order. This effectively removes data file 58b from the list of searchable data files 58, thereby further reducing the size of the mapping table of LBA entries 54.

Additionally, since data file 58b is no longer valid, data file 58c is now the valid data file 58 retained in the lowest physical page of data block 32a. As such, as shown in FIG. 9E, pointer 150 may be redirected to LBA entry 54c, which is the LBA entry 54 corresponding to data file 58c (i.e., pointers 150 and 166 both link to LBA entry 54c). One or more journal entries may also be created in buffer 16 to record the invalidation of data file 58b, to record the removal of LBA entry 54b, to record the updates to descriptor entry 56a.

Finally, when data file 58c is no longer needed, the valid LBA count in descriptor entry 56a may again be reduced by the number of LBAs of data file 58a (i.e., by 12), and the valid LBA count in descriptor entry 56b may be reduced by the remaining number of LBAs of data file 58a (i.e., by 8). LBA entry 54c may then be identified through either pointer 150 or pointer 166 as the LBA entry 54 containing the LBA range for data file 58c.

As shown in FIG. 9F, LBA entry 54c may then be removed from the list of LBA entries 54 and the remaining LBA entries 54 may be re-linked to maintain the numerical LBA order. This effectively removes data file 58c from the list of searchable data files 58, thereby even further reducing the size of the mapping table of LBA entries 54. One or more journal entries may also be created in buffer 16 to record the invalidation of data file 58c, to record the removal of LBA entry 54c, to record the updates to descriptor entries 56a and 56b.

As further shown in FIG. 9F, since data block 32a is full of invalid data files (as indicated by an LBA count of "0" in descriptor entry 56a), data block 32a may be condemned and erased for subsequent use. This may be performed by switching the block state of descriptor block 56a from "write cache" to "condemned", and redirecting pointer 148 to link descriptor entry 56a from write cache group 86 to condemned group 82. This removes data block 32a from the list of write cache blocks 100. At a subsequent point in time, data block 32a may then be erased, as discussed above.

The use of LBA entries 54 associated with data files 58 and descriptor entries 56 associated with data blocks 32 allows FMS 48 to efficiently manage reading, writing, and erasure operations with NVM 18. As discussed above, LBA entries 54 provide a hardware-searchable table of valid LBAs that may reduce search times during read operations. Additionally, descriptor entries 56 supplement LBA entries 54 by providing information relating to data blocks 32, thereby managing write and erasure operations. The combination of LBA entries 54 and descriptor entries 56 accordingly reduce search times and memory bandwidth, while also improving data block management in storage device 10.

Although the present disclosure has been described with reference to preferred embodiments, workers skilled in the art will recognize that changes may be made in form and detail without departing from the spirit and scope of the disclosure.

The invention claimed is:

1. A device comprising:
   at least one non-volatile storage medium comprising a plurality of data blocks;
   a file management system stored on the at least one non-volatile storage medium, the file management system comprising:
      a plurality of logical block address extent entries configured to associate with data files stored in the data blocks; and
      a plurality of descriptor entries configured to associate with the data blocks, wherein each of the plurality of descriptor entries references one of the plurality of logical block address extent entries, and wherein the plurality of descriptor entries are configured to organize the data blocks into separate logical groups, and wherein each of the plurality of descriptor entries comprises descriptor files that include information pertaining to a respective one of the plurality of data blocks and information for grouping data blocks of the plurality of data blocks, and wherein a first one of the descriptor files includes information relating to a current state of the respective data block, and wherein the current state of the respective data block is indicative of one of the separate logical groups to which the descriptor entry and the respective data block belong; and
   at least one controller configured to manage operations with the at least one non-volatile storage medium based at least in part on the file management system.

2. The device of claim 1, wherein the separate logical groups are selected from the group consisting of a condemned group, a free group, a write cache group, a pined cache group, a table group, an anchor group, a defective group, and combinations thereof.

3. The device of claim 1, wherein the data blocks comprise a plurality of anchor blocks, wherein at least one of the plurality of anchor blocks is configured to point to at least one version of the file management system stored on the at least one non-volatile storage medium.

4. The device of claim 1, wherein each of the plurality of logical block address extent entries is configured to:
   associate with a different one of the data files stored in the data blocks or configured to associate with a different cluster of the data files stored in the data blocks;
   link to a different one of the plurality of logical block extent entries based on logical block addresses of the different data files, the logical block addresses being recognizable by a host computer that communicates with the device; and
   link to a different one of the plurality of logical block extent entries based on physical locations of the different data files on the non-volatile storage medium.

5. The device of claim 1, wherein a second one of the descriptor files includes an erase count for the respective data block.

6. The device of claim 5, wherein a third one of the descriptor files includes a pointer to another descriptor entry that belongs to a same one of the separate logical groups as the descriptor entry and the respective data block belong.

7. The device of claim 5, wherein a third one the descriptor files includes a pointer to a previous descriptor entry that belongs to a same one of the separate logical groups as the descriptor entry and the respective data block belong, and wherein a fourth one of the descriptor files includes a pointer to a next descriptor entry that belongs to the same one of the separate logical groups.

8. The device of claim 7, wherein a fifth one of the descriptor files includes a valid logical block address count of the referenced data block, and wherein the valid logical address block count enables the file management system to identify a number of valid data files in the referenced data block.

9. A device comprising:
   at least one non-volatile storage medium comprising a plurality of data blocks;
   a file management system comprising:
      a plurality of logical block address extent entries configured to associate with data files stored in the data blocks, wherein:
         each of the plurality of logical block address extent entries is configured to:
            associate with a different one of the data files stored in the data blocks or configured to associate with a different cluster of the data files stored in the data blocks;
            link to a different one of the plurality of logical block extent entries based on logical block addresses of the different data files, the logical block addresses being recognizable by a host computer that communicates with the device; and
            link to a different one of the plurality of logical block extent entries based on physical locations of the different data files on the non-volatile storage medium; and
         a first one of the plurality of logical block address extent entries references a second one of the plurality of logical block address extent entries based on a range of logical block addresses associated with the second one of the plurality of logical block address extent entries; and
         the first one of the plurality of logical block address extent entries comprises a pointer that references a third one of the plurality of logical block address extent entries based on a physical proximity of a file corresponding to the first logical block address extent entry and a file corresponding to the third logical block address extent entry on the non-volatile storage medium; and
   at least one controller configured to manage operations with the at least one non-volatile storage medium based at least in part on the file management system.

10. The device of claim 9, wherein the file management system further comprises a plurality of descriptor entries configured to associate with the data blocks, wherein each of the plurality of descriptor entries references one of the plurality of logical block address extent entries, and wherein the plurality of descriptor entries are configured to organize the data blocks into separate logical groups.

11. The device of claim 10, wherein the separate logical groups are selected from the group consisting of a condemned group, a free group, a write cache group, a pined cache group, a table group, an anchor group, a defective group, and combinations thereof.

12. The device of claim 9, wherein the data blocks comprise a plurality of anchor blocks, wherein at least one of the plurality of anchor blocks is configured to point to at least one version of the file management system stored on the at least one non-volatile storage medium.

13. A method comprising:

providing, in a data storage device, at least one non-volatile storage medium comprising a plurality of data blocks; and managing, by a controller of the data storage device, operations with the at least one non-volatile storage medium at least based in part on a file management system comprising:

a plurality of logical block address extent entries configured to associate with data files stored in the data blocks, wherein:

each of the plurality of logical block address extent entries is capable of:

associating with a different one of the data files stored in the data blocks or capable of associating with a different cluster of the data files stored in the data blocks;

linking to a different one of the plurality of logical block extent entries based on logical block addresses of the different data files, the logical block addresses being recognizable by a host computer that communicates with the device;

linking to a different one of the plurality of logical block extent entries based on physical locations of the different data files on the non-volatile storage medium, and a first one of the plurality of logical block address extent entries references a second one of the plurality of logical block address extent entries based on a range of logical block addresses associated with the second one of the plurality of logical block address extent entries; and the first one of the plurality of logical block address extent entries comprises a pointer that references a third one of the plurality of logical block address extent entries based on a physical proximity of a file corresponding to the first logical block address extent entry and a file corresponding to the third logical block address extent entry on the non-volatile storage medium.

14. The method of claim 13, wherein the file management system further comprises a plurality of descriptor entries capable of associating with the data blocks, wherein each of the plurality of descriptor entries references one of the plurality of logical block address extent entries, and wherein the plurality of descriptor entries are capable of organizing the data blocks into separate logical groups.

15. The method of claim 14, further comprising selecting the separate logical groups from the group consisting of a condemned group, a free group, a write cache group, a pined cache group, a table group, an anchor group, a defective group, and combinations thereof.

16. The method of claim 13, wherein the data blocks comprise a plurality of anchor blocks, wherein at least one of the plurality of anchor blocks is configured to point to at least one version of the file management system stored on the at least one non-volatile storage medium.

* * * * *